US012711462B2

(12) United States Patent
Rohatgi et al.

(10) Patent No.: US 12,711,462 B2
(45) **Date of Patent: *Aug. 18, 2026**

(54) COMPUTER SYSTEM AND METHODS FOR MANAGING DATA, DATA ACCESS, AND DATA RETENTION

(71) Applicant: Procore Technologies, Inc., Carpinteria, CA (US)

(72) Inventors: Anuj Rohatgi, Austin, TX (US); Allen Kim, Irvine, CA (US); Tabitha Jewett, Ventura, CA (US); Terrence Cole, Santa Barbara, CA (US); Tem K. Boylan, Santa Barbara, CA (US)

(73) Assignee: Procore Technologies, Inc., Carpinteria, CA (US)

(*) Notice: Subject to any disclaimer, the term of this patent is extended or adjusted under 35 U.S.C. 154(b) by 52 days.

This patent is subject to a terminal disclaimer.

(21) Appl. No.: 18/520,368

(22) Filed: Nov. 27, 2023

(65) Prior Publication Data

US 2024/0169320 A1 May 23, 2024

Related U.S. Application Data

(63) Continuation of application No. 17/191,484, filed on Mar. 3, 2021, now Pat. No. 11,829,951.

(51) Int. Cl.
*G06Q 10/10* (2023.01)
*G06F 16/11* (2019.01)
(Continued)

(52) U.S. Cl.
CPC ......... *G06Q 10/103* (2013.01); *G06F 16/125* (2019.01); *G06Q 10/06313* (2013.01); *G06Q 50/08* (2013.01)

(58) Field of Classification Search
CPC .... G06Q 10/103; G06Q 10/101; G06Q 50/08; H04L 63/101; H04L 63/08; H04L 63/10; G06F 2221/2141; G06F 9/468
(Continued)

(56) References Cited

U.S. PATENT DOCUMENTS 8,548,997 B1 10/2013 Wu
8,818,935 B2 * 8/2014 Reisdorf .............. G06Q 10/101 707/610

(Continued)

FOREIGN PATENT DOCUMENTS

KR 102131946 B1 7/2020

OTHER PUBLICATIONS

Jianping Zhang et al., A multi-server information-sharing environment for cross-party collaboration on a private cloud, Automation in Construction, vol. 81, 2017, pp. 180-195, ISSN 0926-5805 https://doi.org/10.1016/j.autcon.2017.06.021. (Year: 2017).*

(Continued)

*Primary Examiner* — Rutao Wu
*Assistant Examiner* — Letoria G Knight
(74) *Attorney, Agent, or Firm* — Lee Sullivan Shea & Smith LLP

(57) ABSTRACT

Techniques for managing data and data connections for a construction project involve (1) establishing respective data connections between (i) each party-entity data record and a project-entity data record for the construction project, and (ii) each party-entity data record and each respective object-entity data record for the construction project, (2) determining each party's permissions for retaining access to (i) the project-entity data record and (ii) each object-entity data record after a trigger event occurs, and (3) generating (i) respective connection data encoding the party's permissions for retaining access to the project-entity data record to be (Continued)

stored in association with the respective data connection between the party-entity data record and the project-entity data record and (ii) respective connection data encoding the party's permissions for retaining access to each respective object-entity data record in association with the respective data connection between the party-entity data record and the respective object-entity data record.

20 Claims, 8 Drawing Sheets

(51) Int. Cl.
*G06Q 10/0631* (2023.01)
*G06Q 50/08* (2012.01)

(58) Field of Classification Search
USPC .......... 709/205; 707/608; 705/7.23; 726/28, 726/30, 29
See application file for complete search history.

(56) References Cited

U.S. PATENT DOCUMENTS 8,966,445 B2 2/2015 Ahlgren et al.
11,416,561 B1 8/2022 Satish et al.
2010/0088471 A1* 4/2010 Sunaga ................ G06F 15/167 711/147
2011/0231777 A1 9/2011 Koren
2014/0270178 A1* 9/2014 Kiang .................. G06F 21/602 380/281
2014/0372539 A1 12/2014 Zaveri
2015/0149929 A1* 5/2015 Shepherd ............ H04L 12/1822 715/753
2015/0163206 A1* 6/2015 McCarthy .......... G06F 21/6227 726/4
2015/0286828 A1 10/2015 Bulumulla et al.
2017/0091466 A1 3/2017 Meyer et al.
2017/0099297 A1* 4/2017 Armer .................. H04L 63/102
2017/0147600 A1* 5/2017 Brand ................. G06Q 10/107
2017/0155632 A1 6/2017 Filman et al.
2018/0189733 A1 7/2018 Newhouse et al.
2019/0222560 A1* 7/2019 Ford .................... H04W 12/06
2020/0065509 A1 2/2020 Ojha
2021/0064775 A1 3/2021 Mishra et al.
2021/0243150 A1* 8/2021 Vasamsetti ........... H04L 12/185
2021/0409352 A1* 12/2021 Arunachalam ....... H04L 63/105

OTHER PUBLICATIONS

Abioye, Sofiat O. et al., "Artificial Intelligence in the Construction Industry: A Review of Present Status, Opportunities and Future Challenges", Journal of Building Engineering, vol. 44, Oct. 5, 2021, 13 pages.
International Searching Authority, PCT International Search Report and Written Opinion, PCT International Application No. PCT/US2022/018120, dated Jun. 16, 2022, 10 pages.
Wang, Weigang, "Team-and-Role-Based Organizational Context and Access Control for Cooperative Hypermedia Environments", Proceedings of the Tenth ACM Conference on Hypertext and Hypermedia: Returning to our Diverse Roots: Returning to our Diverse Roots, 1999, pp. 37-46.

* cited by examiner

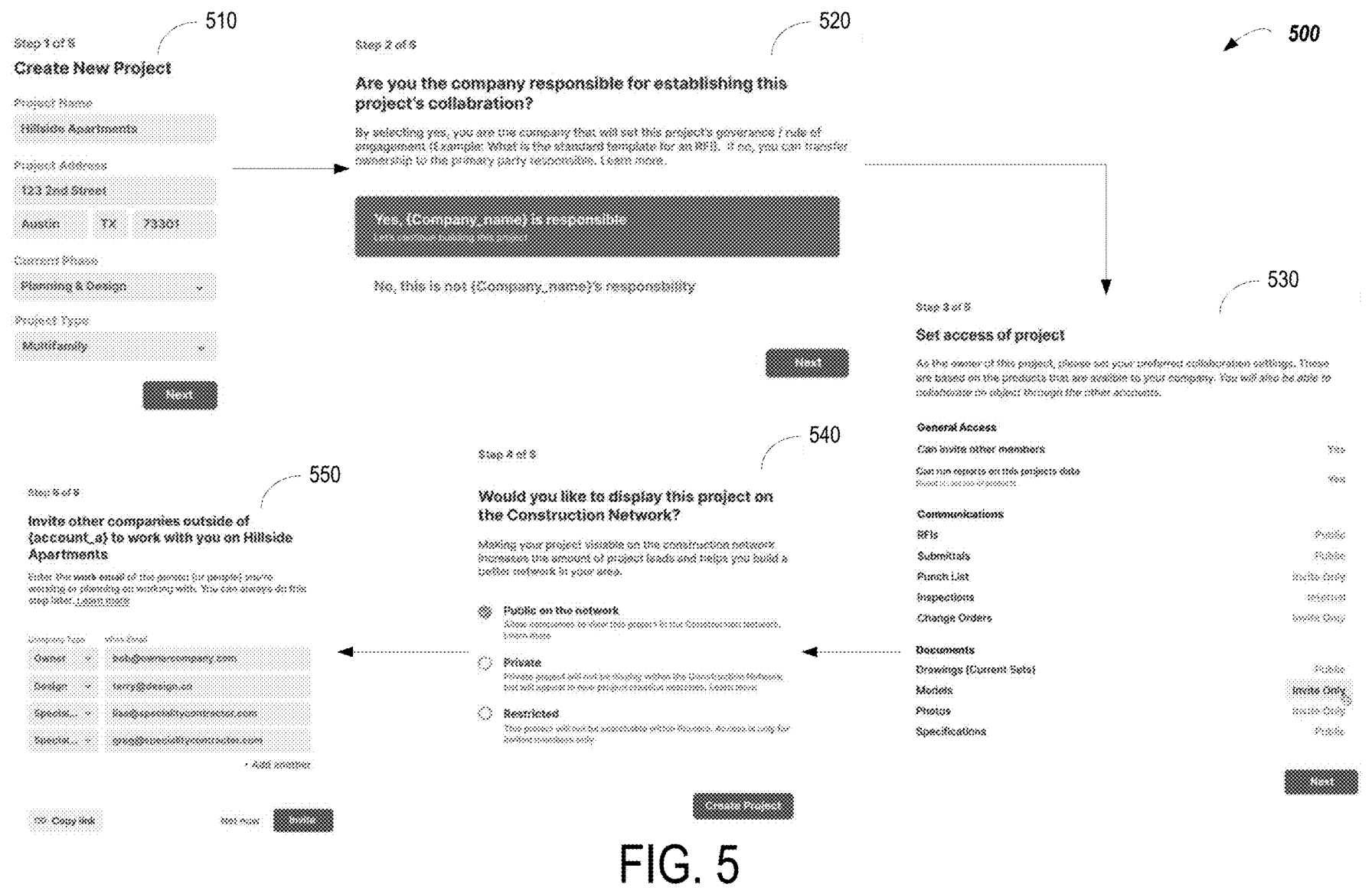

500

510

Create New Project

520

Are you the company responsible for establishing this project's collaboration?

530

Set access of project

540

Would you like to display this project on the Construction Network?

550

Invite other companies outside of {account_a} to work with you on Hillside Apartments

FIG. 5

COMPUTER SYSTEM AND METHODS FOR MANAGING DATA, DATA ACCESS, AND DATA RETENTION

CROSS REFERENCE TO RELATED APPLICATIONS

The present application is a continuation of U.S. application Ser. No. 17/191,484, filed Mar. 3, 2021, and titled "Computer System and Methods for Managing Data, Data Access, and Data Retention," the contents of which are explicitly incorporated by reference herein in their entirety.

BACKGROUND

Construction projects are often complex endeavors involving the coordination of many professionals across several discrete phases. Typically, after negotiation between parties involved in a construction project is complete and the scope of the construction project is agreed upon, the construction project commences with a design phase, where architects design the overall shape and layout of the construction project, such as a building. Next, engineers engage in a planning phase where they take the architects' designs and produce engineering drawings and plans for the construction of the project. At this stage, engineers may also design various portions of the project's infrastructure, such as HVAC, plumbing, electrical, etc., and produce plans reflecting these designs as well. After, or perhaps in conjunction with, the planning phase, contractors may engage in a logistics phase to review these plans and begin to allocate various resources to the project, including determining what materials to purchase, scheduling delivery, and developing a plan for carrying out the actual construction of the project. Finally, during the construction phase, construction professionals begin to construct the project based on the finalized plans.

To manage these and other phases of a construction project successfully from initiation to completion, parties involved in a construction project need to be able to interact and share project information effectively.

In this regard, a forum that provides improved capability for efficient cross-party collaboration is desirable.

Overview

Indeed, a highly-involved construction project may require significant collaboration and coordination between different parties throughout the various phases of the construction project. For instance, a construction company may be responsible for funding a given construction project for a building and collaborating with an architect on its design. The architect may then collaborate with a general contractor on the construction of the building. In turn, the general contractor may hire one or more subcontractors to collaborate and coordinate on various aspects of the building, which may require the general contractor and the one or more subcontractors to exchange various project information (e.g., drawings, design requirements, building codes, regulations, action items, etc.).

The collaboration that takes place between different parties involved in a construction project may take various forms. As one possibility, a given subcontractor may require specific information in order to complete a given construction task and may inquire about such information by sending the general contractor a Request for Information ("RFI"). As another possibility, an engineer may wish to revise one or more given drawings to update schematic information related to the construction project. As yet another possibility, a construction professional may wish to capture and upload images while conducting an on-site inspection of a given area of the construction project. As further yet another possibility, one or more unforeseen obstacles may arise throughout the lifecycle of the construction project, which may require two or more parties to collaborate on various tasks such as renegotiating a given contract, revising a given form, or updating a given budget, among other possibilities. Many other types of collaborations are possible and may require different parties, each of which may be responsible for a certain aspect of the construction project, to communicate and coordinate efficiently regarding the various aspects of the construction project and various data relating to the construction project.

Unfortunately, the collaboration that takes place between different parties involved in a construction project can be complicated and cumbersome, giving rise to inefficiencies. As one example, outstanding requests from one party to another may be inadvertently overlooked and may require several follow-ups to obtain the information required in order to proceed with a given task/phase of the construction project. As another example, given information may undergo several rounds of revisions, especially if input from multiple parties is required, which may increase the difficulty of tracking revisions to the information and ensuring that the most up-to-date version of the information is easily identifiable and accessible. Other examples of inefficiencies are also possible.

In view of the foregoing, software applications have been developed to assist with the task of managing a construction project electronically. For instance, Procore Technologies, Inc., who is the assignee of the present application, offers a construction management software application that includes various software tools to help facilitate collaboration between different parties involved in a construction project.

In practice, a construction management software application may be provided to a user in the form of a software as a service ("SaaS"), in which case the software application may include a front-end software component running on a user's client station and a back-end software component running on a back-end platform that is accessible to the user's client station via a communication network such as the Internet. Further, in practice, the back-end platform associated with a construction management SaaS application may be capable of serving multiple different parties that have signed up for access to the construction management SaaS application, where each such party has its own respective account for the construction management SaaS application.

Construction management SaaS applications provide construction professionals and other users who are involved in a construction project with the ability to collaborate electronically throughout the lifecycle of the project, spanning from inception to completion. While construction management applications help streamline the collaboration between involved parties, one of the challenges that must be considered and addressed by such applications is management of data that is created in connection with the project.

Generally, two key concepts inform how data is managed by a SaaS application: data access permissions and data retention rights. Access permissions define (i) the data that a user may access and (ii) actions the user may take with respect to that data. Retention rights define the extent to which a user may retain a copy of the data in the event that the user's access to the data is revoked.

The existing approach for data management that is employed by construction management SaaS applications that facilitate cross-party collaboration is based on a model that stores data of a project under a given account of the SaaS application (also referred to herein as an account-centric model). To collaborate on a construction project with other parties, a first party (e.g., construction company that has a paid account with the construction management application) may log into its account and create a project. The project is then stored within the first party's account. As the creator of the project, the first party is designated as the party owner (also referred to herein as an owner or an owner party) of the construction project. The owner may then invite other stakeholders (referred to herein as collaborators or collaborator parties) to access the project. The collaborators may have their own existing accounts with the construction management application, in which case they may log into their respective accounts, enter the construction project details to locate the construction project, and access the construction project. Alternatively, the collaborators may not have existing accounts, in which case, they may be provided with basic accounts that have limited permissions, access, and features, that the collaborators may then use to access the project.

As mentioned above, under the existing approach, data management is based on an account-centric model such that all data created under a construction project is created, stored, and maintained under a single account—namely, the project owner's account. This presents several drawbacks. As one example, because all data related to the collaboration between the project owner and the collaborators is stored under the owner's account, a collaborator may not have an allocated space within the project to independently create and edit data privately. For example, the collaborator may be unable to record any confidential information that the collaborator may not wish to share with the project owner. Furthermore, a collaborator may have limited or no capability to communicate or share data with other collaborators.

As another example, because project data related to a given project is stored under the project owner's account, collaborators may have little to no retention rights with respect to the data resulting from their collaboration on the given project. Typically, in the event that a collaborator's access to a project is revoked (e.g., the project owner deletes the project after completion, or the owner and collaborator disagree and the owner removes the collaborator from the project, etc.), the collaborator has no retention rights to the project and is thereafter unable to retain a copy of data that the collaborator created or contributed to during the collaboration. As a result, a collaborator typically loses project data that it has created, revised, or otherwise collaborated on throughout the duration of a given project. This can be problematic for various reasons. As one example, a collaborator may wish to make use of data it created or otherwise collaborated on for its own independent business purposes in the future (e.g., to inform the collaborator's actions at a future time regarding a construction project that does not involve the project owner). However, because the collaborator is unable to retain data that is stored in the project owner's account, it may be unable to preserve such data. Other examples are also possible.

In order to preserve given project data from a given project, a collaborator would need to create a new version of the given project data within the collaborator's independent account. This presents several drawbacks. First, the collaborator may not have an existing independent account and may be using a guest account for the given project. The collaborator would then need to purchase a subscription to the construction management application service and then create an account. However, the collaborator may not require a long-term subscription to the construction management service, and investing in a paid account for the sole purpose of re-creating project data may not be worthwhile or economically feasible. Second, in order to ensure that it retains the most recently-updated version of the given project data, the collaborator would need to update the new version of the given project data every time the original project data is revised, which may be cumbersome and time-consuming and may result in some revisions to the original project data being overlooked when updating the new version of the given project data in the collaborator's account. Third, any confidential information the collaborator wishes to record in relation to given project data would be stored within the collaborator's account and would not be linked to the given project data in the owner's account. As such, the collaborator would be unable to refer to the confidential information when viewing the original given project data in the project owner's account. Furthermore, the collaborator may not be able to share the confidential information with another collaborator.

One way to improve upon the existing approach is to enable user accounts of the construction management application to be "mirrored" such that data objects can be copied and shared with other user accounts. This approach is described in U.S. application Ser. No. 16/580,775 titled "Computer System and Method for Mirroring Data Across Different Accounts of a Software as a Service (SaaS) Application," which is assigned to the present applicant Procore Technologies, Inc. and incorporated herein in its entirety. This approach allows for parties to link their respective accounts and enable specific data objects to be mirrored across the linked accounts. At a high level, a separate instance of a given data object may exist in each of the linked accounts, and the separate instances of the given data object may be associated such that updates to one instance of the given data object are mirrored on every other instance of the given data object. This approach addresses many of the drawbacks discussed above. In particular, this approach foregoes a collaborator's need to manually create and update a separate version of project data for which the collaborator wishes to retain access. Instead, this approach allows the collaborator to retain a copy of the project data on which it collaborated during a project. Therefore, in the event that the owner of the project revokes the collaborator's access to the project at any given point in time, the collaborator is able to retain access to the mirrored version of the project data up until the point in time that the collaborator's access to the project data was revoked.

However, this data mirroring approach leaves some of the drawbacks mentioned above unaddressed, such as the inability of a collaborator to create and share confidential data in a way that allows the confidential data to be associated with its original parent data. Additionally, the data mirroring approach presents its own drawbacks. First, this approach requires each collaborating party to create an instance of the project in its own account and then create an instance of each data object on which the collaborators wish to collaborate so that the instances of those data objects may then be linked and mirrored across the accounts of the project owner and the collaborators. Second, this approach requires the back-end platform running the construction management SaaS application to maintain a copy of each instance of each data object that has been selected for mirroring, which may result in the back-end platform maintaining multiple copies of various data objects. Maintaining multiple instances of a given data object may result in an inefficient use of platform resources. Further, maintaining multiple instances of a given data object may increase the likelihood of one or more updates failing to propagate across all linked accounts. Further yet, multiple instances of a given data object may increase the difficulty of identifying an original instance or a single source of truth of a given data object. Third, this approach does not facilitate live collaboration such that one or more parties may view, edit, or otherwise collaborate on a specific data object in real-time within the SaaS application.

Therefore, there remains a need for technology that enables efficient management of data and facilitates collaboration between multiple parties on a construction project in a manner that protects data integrity and allows for flexible and/or customized definition of access permissions and data retention settings.

To help address the above-mentioned and other problems, disclosed herein is an improved data management and collaboration model for managing data related to and enabling collaboration between multiple parties on a construction project. At a high level, the disclosed data management and collaborative model facilitates improved collaboration between multiple parties collaborating on a construction project and facilitates improved management of data related to the construction project. Under the disclosed data management approach, data related to a given construction project may be stored as an independent entity separately from any one party's account, including the account of the party who created the project. This approach helps maintain a single source of truth for project data related to a given construction project. Furthermore, this approach enables independent connections to be established between a data entity that represents a given construction project and one or more other data entities parties or project data such that a given connection can be created or removed without impacting the data structure of the data entity of the given construction project.

The disclosed data management and collaborative model may facilitate improved collaboration between multiple parties in various ways. As one possibility, the disclosed collaborative model may provide for improved flexibility and customization with respect to the data structure of a party's account.

In general, a party may be represented by a data entity that is encoded with data including relevant information about the party. Such information may take various forms.

One example of relevant information about a party may include information regarding a real-world entity that is represented by the party. In this regard, a party that has an account with a construction management SaaS application may represent an individual (e.g., a human user) or a company (e.g., a business entity). A party that represents an individual (also referred to herein as an individual-party) may be managed by the individual. For example, a party that represents an employee of a construction company may be managed by the employee himself. An account of a party that represents a company (also referred to herein as a company-party) may also be managed by an individual. For example, a given company having a construction management SaaS application account that represents the company may have a designated employee (e.g., account manager) who is responsible for managing the account of the given company and performing various tasks on behalf of the company via the company's account. A party may represent other entities as well.

As another possibility of facilitating improved collaboration between multiple parties, the disclosed collaborative model may provide improved capability for parties to interact with each other. In one aspect, a party may "connect" with one or more other parties. Each connection between two parties may be associated with respective connection data that includes information about the connection (e.g., when the connection was established, etc.), information about each party, and information about the parties' relationship (e.g., employer-employee, etc.). Such connection data may be stored independently from either party's data entity. In this way, changes may be made to a given connection without impacting (or impacting to a minimal degree) the data entity of a party with which the connection is established.

Further, a party may also connect with one or more parties that are not existing customers of the construction management application. In this regard, initiating a connection with a non-customer collaborator may provide the non-customer collaborator with an option to create a free guest account, which may be beneficial for various reasons. As one example, current customers of the construction management application may be provided with an expanded scope of potential collaborators for a given construction project. As another example, non-customers may be provided with an opportunity to explore the services provided by the application in order to determine if the services would be beneficial to them.

In addition to facilitating improved collaboration between multiple parties, the disclosed model may facilitate improved management of data related to a given construction project. A construction project may be represented within a construction management SaaS application by a data entity that is encoded with data including relevant information about the project, herein referred to as a "project entity." A project entity may be accessed by and collaborated on by one or more parties.

The creation of a project entity by a party (i.e., a party having a paid account with the construction management SaaS application) may establish a first "connection" between the project entity and the creating party. Similarly, when other parties access the project entity, a respective connection between the project entity and each other party may be established. A project entity may be associated with one or more additional data entities, herein referred to as data object entities or data objects, that may be created in relation to (or "under") the project entity. All of the data objects created under a project entity may collectively represent the "project data" related to the project entity.

A data object may take various forms. As one possibility, a data object may take the form of an object entity, which may represent data that can be collaborated on by parties. An object entity may be a tool offered by the construction management application, such as an RFI or a Punch List, as some examples. An object entity may also be an object within a tool, such as a Submittal, or a Bid Package, as some examples. An object entity may take the form of a document, a drawing file, an image file, or a template, among other possibilities. As another possibility, a data object may take the form of a field entity, which may represent specific data within, or related to, a given object entity. A field entity may take the form of data such as a comment, an annotation, or a chat, as some examples. Other examples are also possible.

The creation of a data object under a project entity may further establish respective connections between (i) the data object and the project entity, (ii) the data object and the party creating the data object, (iii) if the data object is related to a second data object (e.g., a field entity created under an object entity), the data object and the second data object, and (iv) the data object and each party invited to collaborate on the data object (e.g., each party with whom the data object is shared).

Any given connection may have associated connection data that includes various information about that connection. Connection data for a given connection may be generated and stored at the time the connection is established. Further, connection data may be stored independently of the data structure of any given data entity, thereby allowing the data structure of the given data entity (e.g., the project entity or the data object) to remain unaffected by changes to a given connection. For example, data related to a project entity or a data object may be stored with the data structure of the project entity or the data object itself, whereas connection data for one or more connections of the project entity or the data object may be stored separately while still associated with the project entity or the data object. In this way, connections may be created or removed from a given project entity or a given data object without impacting the data structure of the given project entity or the given data object.

Connection data associated with a given connection may include various information. As one possibility, connection data may include information about data access permissions and retention settings. As another possibility, connection data may include information about how two data entities are related. As yet another possibility, connection data may include historical information about one or more data entities. Connection data may include other information as well.

In general, a party that is related to a given project entity may be a project owner or a project collaborator. A project owner may be a party that is designated as a party responsible for managing and overseeing the construction project represented by the given project entity. Therefore, a project owner may have a unique set of default access permissions and retention settings that may be automatically granted to the project owner at the time of creating a project entity. For example, the project owner may have access to a set of tools and features that provide the owner with the capability to perform unilateral actions regarding the project entity. Such owner-specific actions may include: sharing the project entity with one or more parties (e.g., inviting other parties to access and collaborate on the project entity); configuring, for each collaborator that is invited to collaborate on the project entity, a respective set of default access permissions and retention settings; determining the visibility of the project entity within the construction management application; and archiving the project entity and/or related project data or deleting the project entity and/or related project data. A given project entity may have more than one project owner.

A project collaborator may be a party that is invited to access and collaborate on an existing project entity. As discussed above, a project collaborator may represent an individual or a company. A collaborator may generally be bound by a set of default access permissions and retention settings that have been configured by the project owner specifically for the collaborator. However, in some instances, a collaborator's default access permissions and retention settings may be modified by the project owner during the course of a project. In some instances, a collaborator may also renegotiate or request to modify its default access permissions and retention settings.

In general, access permissions may define what project data a party may access and what actions the party may perform with respect to that project data. Retention settings may define a party's right to retain a copy of project data in the event that the party's access to the project data is revoked. As mentioned, a project owner may define, for each collaborator that will be invited to collaborate on a project entity, a set of default access permissions and data retention settings. The collaborator's default access permissions and retention settings may be configured to apply to all types of data objects. Alternatively, the collaborator's default access permissions and settings may be configured such that different settings may apply to different types of data objects.

A project owner may define a collaborator's default access permissions settings in various ways. In one aspect, the project owner may determine if the collaborator may invite other collaborators to access the project entity. In this regard, when a project owner invites a given collaborator that represents a company to collaborate on a given project entity, the project owner may configure the given collaborator's general access permissions in a way that allows the given collaborator to invite additional collaborators (e.g., one or more of the company's employees) to collaborate on the project entity. The project owner may further configure the given collaborator's permissions such that the given collaborator may configure, for each additional collaborator that the given collaborator invites to collaborate on the project entity, a respective set of default access permissions and retention settings.

In another aspect, the project owner may define a scope of access for the given collaborator with respect to project data related to the project entity. The scope of access may include what project data (e.g., what types of data entities) the given collaborator may access and what actions the given collaborator may perform with respect to accessible project data. Permissible actions may include, among other examples, the ability to create, read, update, delete, or share data. The project owner may define the scope of access in various ways. As one possibility, the project owner may define the scope of access based on different levels of access. As one example, "full" access permissions may permit the given collaborator to access all project data related to the project entity and perform all permissible actions with respect to the project data. As another example, "limited" access permissions may permit the collaborator to access only project data that is specifically shared with the given collaborator and perform only certain permissible actions with respect to that project data. The project owner may further specify what type of project data the collaborator may access and what specific actions the collaborator may perform with respect to that project data.

In yet another aspect, the project owner may configure a collaborator's access permissions to take effect at a given time. As one example, the collaborator's access permissions settings may take effect at the time the collaborator accepts the project owner's invitation to access the project entity. As another example, the project owner may configure the given collaborator's access permissions settings so as to take effect at a given future date and/or time.

After defining the collaborator's access permissions settings, the project owner may define the collaborator's retention settings. A party's retention rights may be categorized into three levels: full retention, partial retention, and no retention. Having full retention rights permits a collaborator to retain previously accessible project data in a "full" capacity, such that the collaborator retains access to an editable copy of the project data. Having full retention rights may permit a collaborator to retain access to previously accessible project data in a read/write capacity, such that the collaborator retains access to an editable copy of the project data. Having limited retention rights may permit the collaborator to retain access to previously accessible project data in a limited capacity, such that the collaborator retains access to a read-only copy of the project data. Having no retention rights may prevent the given collaborator from retaining access to previously accessible project data in any capacity.

In the manner described above, the project owner may define default access permissions and retention settings for one or more collaborators that will be invited to access the project entity.

When a new project entity is created by a project owner, a connection between the project owner and the project entity is established. The connection may be associated with connection data that includes the project owner's default access permissions and retention settings with respect to the project entity. As mentioned above, the project owner may invite one or more collaborators to collaborate on the project entity. An invitation that is sent to a collaborator may include a description of the collaborator's default access permissions and retention settings for the project entity as configured by the project owner. Accepting the invitation to collaborate on the project entity may require the collaborator to agree to its respective default access permissions and retention settings.

When a given collaborator accepts an invitation to collaborate on a project entity, a connection between the project entity and the given collaborator is established. Furthermore, the connection between the given collaborator and the project entity may be associated with connection data that includes the collaborator's default access permissions and retention settings for the project entity. In some instances, the project owner may have created a set of data objects under the project entity by the time the given collaborator has accepted the invitation to collaborate. In such instances, the given collaborator's default access permissions and retention settings may also be propagated to each existing data object. Therefore, for each existing data object, a connection between the given collaborator and the existing data object may be established, and the connection may be associated with connection data that defines, as the given collaborator's general access permissions and retention settings for the existing data object, the given collaborator's default access permissions and retention settings for the project entity. At a subsequent time, when collaboration between the given collaborator and the project owner ends, the computing platform may use the given collaborator's stored data retention settings with respect to a given data object to implement the given collaborator's retention rights for the given data object.

Similarly, with each new data object that is created under an existing project entity, respective connections may be established between the new data object and the creating party and the new data object and each party with whom the data object is shared. Each respective connection may be associated with respective connection data that includes each party's defined access permissions and retention settings with respect to the new data object. A party's defined access permissions and retention settings for the new data object may or may not be the same as the party's default access permissions and retention settings for the project entity. Defining access permissions and retention settings for a given party with respect to a new data object is discussed in more detail further below.

When collaboration between the project owner and a given collaborator ends, the given collaborator's defined retention settings for a given data object may dictate the given collaborator's retention rights for the given data object.

In accordance with the above, in one aspect, disclosed herein is a method that involves a computing system (i) receiving, from a first party, a first request to create a project entity for a construction project; (ii) after receiving the first request to create the project entity: creating the project entity for the construction project; (1) establishing a first data connection between the first party and the project entity; and (2) defining the first party's default data retention settings for the project entity; (iii) receiving, from the first party, a second request to create a first set of one or more data objects associated with the project entity, wherein the second request comprises data defining the first set of one or more data objects associated with the project entity; (iv) for each respective data object in the first set of one or more data objects associated with the project entity: (1) creating the respective data object; (2) establishing a respective data connection between the first party and the respective data object; and (3) defining the first party's data retention settings for the respective data object; (v) receiving, from the first party, data defining an invitation for a second party to collaborate on the project entity for the construction project, wherein the invitation includes the first party's proposal of the second party's default data retention settings for the project entity; (vi) receiving, from the second party, an indication that the second party has accepted the first party's invitation to collaborate on the project entity for the construction project; and (vii) after receiving the indication that the second party has accepted the first party's invitation to collaborate: establishing a second data connection between the second party and the project entity; (1) based on the first party's proposal of the second party's default data retention settings for the project entity, defining the second party's default data retention settings for the project entity; (2) establishing a respective data connection between the second party and each respective data object in the first set of one or more data objects; and (3) defining the second party's data retention settings for each respective data object in the first set of one or more data objects to match the second party's default data retention settings for the project entity.

In another aspect, disclosed herein is a computing system that includes a network interface, at least one processor, a non-transitory computer-readable medium, and program instructions stored on the non-transitory computer-readable medium that are executable by the at least one processor to cause the computing system to carry out the functions disclosed herein, including but not limited to the functions of the foregoing method.

In yet another aspect, disclosed herein is a non-transitory computer-readable medium comprising program instructions that are executable to cause a computing system to carry out the functions disclosed herein, including but not limited to the functions of the foregoing method.

One of ordinary skill in the art will appreciate these as well as numerous other aspects in reading the following disclosure.

BRIEF DESCRIPTION OF THE DRAWINGS

FIG. 5 depicts example GUI views that may be presented to a party in order to create a project entity for a given construction project.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

I. EXAMPLE SYSTEM CONFIGURATION

The present disclosure is generally directed to software technology for managing data for and facilitating collaboration on construction projects, and in particular to a computing system and methods for managing data, data access, and data retention. As one possible implementation, this software technology may include both front-end software running on client stations that are accessible to individuals associated with construction projects (e.g., contractors, project managers, architects, engineers, designers, etc., each of which may be referred to generally herein as a "construction professional") and back-end software running on a back-end computing platform (sometimes referred to as a "cloud" platform) that interacts with and/or drives the front-end software, and which may be operated (either directly or indirectly) by the provider of the front-end client software. As another possible implementation, this software technology may include front-end client software that runs on client stations without interaction with a back-end computing platform. The software technology disclosed herein may take other forms as well.

In general, such front-end client software may enable one or more individuals responsible for a construction project to perform various tasks related to the management of the construction project, which may take various forms. According to some implementations, these tasks may include, as some non-limiting examples, creating one or more data objects, defining access permissions and data retention settings for one or more parties, inviting one or more parties to collaborate on a given project, and creating, accessing, and/or editing one or more data objects during collaboration on a given project. Further, such front-end client software may take various forms, examples of which may include a native application (e.g., a mobile application), a web application running on a client station, and/or a hybrid application, among other possibilities.

Figure 1:
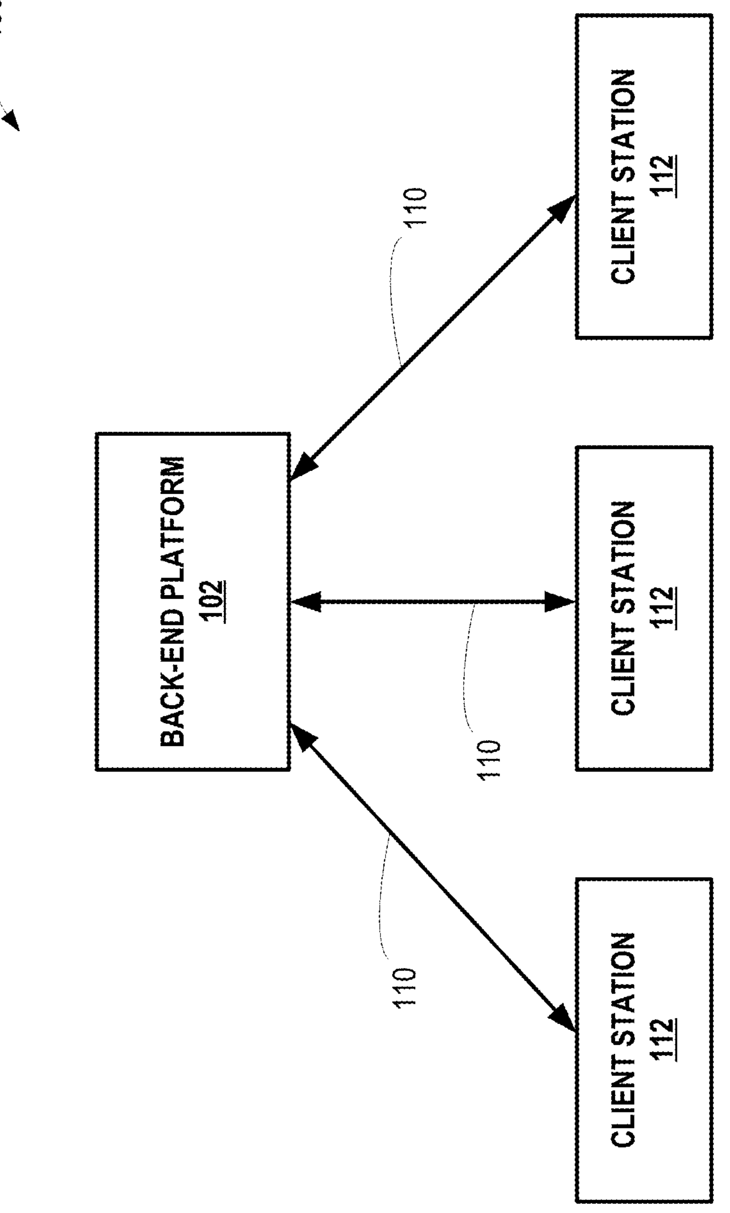
FIG. 1 depicts an example network configuration in which example embodiments may be implemented.

Turning now to the figures, FIG. 1 depicts an example network configuration 100 in which example embodiments of the present disclosure may be implemented. As shown in FIG. 1, network configuration 100 includes a back-end computing platform 102 that may be communicatively coupled to one or more client stations, depicted here, for the sake of discussion, as client stations 112.

Broadly speaking, back-end computing platform 102 may comprise one or more computing systems that have been provisioned with software for carrying out one or more of the functions disclosed herein, including but not limited to: creating and storing one or more project entities, creating and storing data objects related to a given project entity, establish data connections between parties and data objects, generating and storing connection data associated with a given connection, storing a given party's access permissions and retention settings with respect to a given data object, and/or transmitting data and/or instructions that cause one or more client stations 112 to output information related to a construction project, including a project entity and one or more data objects related to the construction project. The one or more computing systems of back-end computing platform 102 may take various forms and be arranged in various manners.

For instance, as one possibility, back-end computing platform 102 may comprise computing infrastructure of a public, private, and/or hybrid cloud (e.g., computing and/or storage clusters) that has been provisioned with software for carrying out one or more of the functions disclosed herein. In this respect, the entity that owns and operates back-end computing platform 102 may either supply its own cloud infrastructure or may obtain the cloud infrastructure from a third-party provider of "on demand" computing resources, such as Amazon Web Services (AWS) or the like. As another possibility, back-end computing platform 102 may comprise one or more dedicated servers that have been provisioned with software for carrying out one or more of the functions disclosed herein. Other implementations of back-end computing platform 102 are possible as well.

In turn, client stations 112 may each be any computing device that is capable of running the front-end software disclosed herein. In this respect, client stations 112 may each include hardware components such as a processor, data storage, a user interface, and a network interface, among others, as well as software components that facilitate the client station's ability to run the front-end software disclosed herein (e.g., operating system software, web browser software, etc.). As representative examples, client stations 112 may each take the form of a desktop computer, a laptop, a netbook, a tablet, a smartphone, and/or a personal digital assistant (PDA), among other possibilities.

As further depicted in FIG. 1, back-end computing platform 102 is configured to interact with client stations 112 over respective communication paths 110. In this respect, each communication path 110 between back-end computing platform 102 and one of client stations 112 may generally comprise one or more communication networks and/or communications links, which may take any of various forms. For instance, each respective communication path 110 with back-end computing platform 102 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication path 110 with back-end computing platform 102 may be wireless, wired, or some combination thereof, and may carry data according to any of various different communication protocols. Although not shown, the respective communication paths 110 between client stations 112 and back-end computing platform 102 may also include one or more intermediate systems. For example, it is possible that back-end computing platform 102 may communicate with a given client station 112 via one or more intermediary systems, such as a host server (not shown). Many other configurations are also possible.

The interaction between client stations 112 and back-end computing platform 102 may take various forms. As one possibility, client stations 112 may send certain user input related to a construction project to back-end computing platform 102, which may in turn trigger back-end computing platform 102 to take one or more actions based on the user input. As another possibility, client stations 112 may send a request to back-end computing platform 102 for certain project-related data and/or a certain front-end software module, and client stations 112 may then receive project-related data (and perhaps related instructions) from back-end computing platform 102 in response to such a request. As yet another possibility, back-end computing platform 102 may be configured to "push" certain types of project-related data to client stations 112, such as rendered three-dimensional views, in which case client stations 112 may receive project-related data (and perhaps related instructions) from back-end computing platform 102 in this manner. As still another possibility, back-end computing platform 102 may be configured to make certain types of project-related data available via an API, a service, or the like, in which case client stations 112 may receive project-related data from back-end computing platform 102 by accessing such an API or subscribing to such a service. The interaction between client stations 112 and back-end computing platform 102 may take various other forms as well.

Although not shown in FIG. 1, back-end computing platform 102 may also be configured to receive data, such as data related to a construction project, from one or more external data sources, such as an external database and/or another back-end computing platform or platforms. Such data sources—and the data output by such data sources—may take various forms.

It should be understood that network configuration 100 is one example of a network configuration in which embodiments described herein may be implemented. Numerous other arrangements are possible and contemplated herein. For instance, other network configurations may include additional components not pictured and/or more or less of the pictured components.

II. EXAMPLE COMPUTING DEVICE

Figure 2:
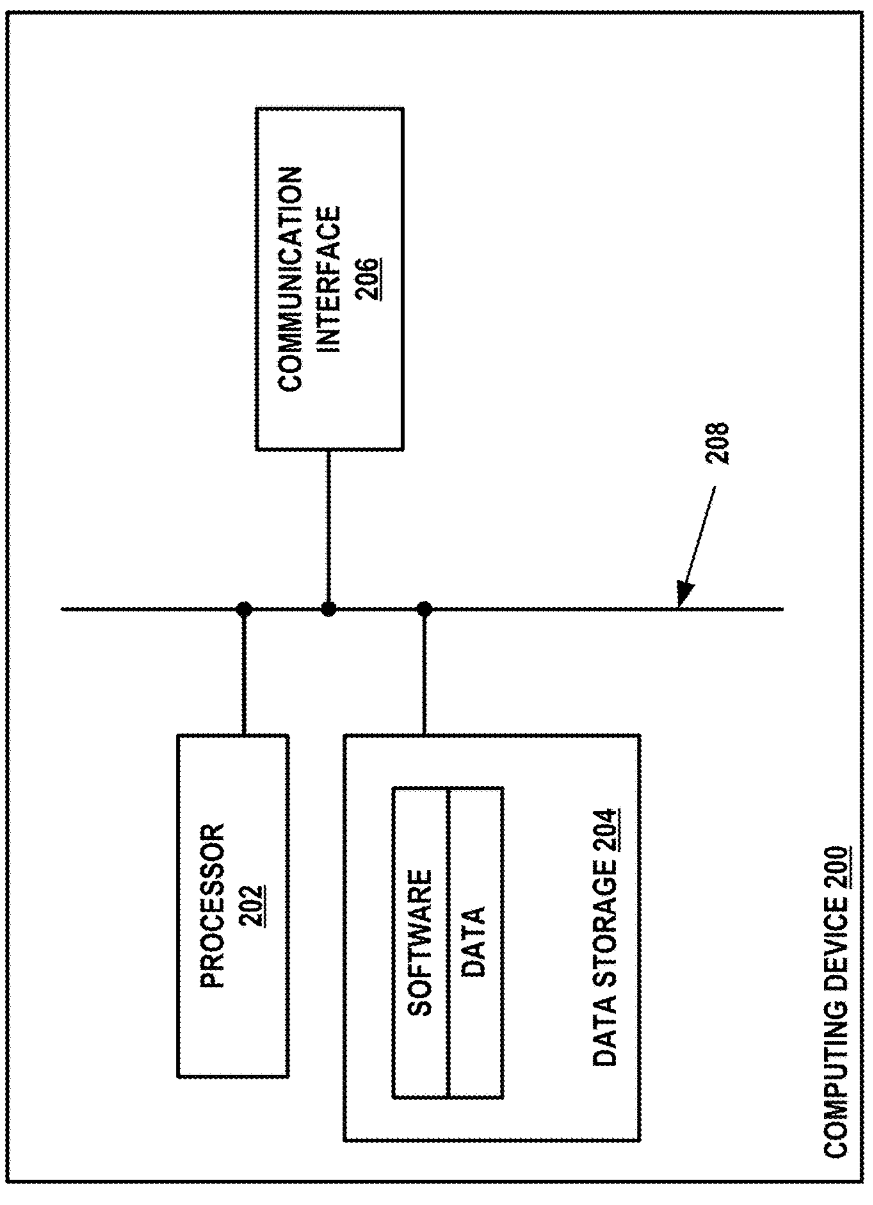
FIG. 2 depicts an example computing device that may be configured to carry out one or more of the functions of the present disclosure.

FIG. 2 is a simplified block diagram illustrating some structural components that may be included in an example computing device 200, which could serve as, for instance, the back-end computing platform 102 and/or one or more of client stations 112 in FIG. 1. In line with the discussion above, computing device 200 may generally include at least a processor 202, data storage 204, and a communication interface 206, all of which may be communicatively linked by a communication link 208 that may take the form of a system bus or some other connection mechanism.

Processor 202 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 202 could comprise processing components that are distributed across a plurality of physical computing devices connected via a network, such as a computing cluster of a public, private, or hybrid cloud.

In turn, data storage 204 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 204 may comprise computer-readable storage mediums that are distributed across a plurality of physical computing devices connected via a network, such as a storage cluster of a public, private, or hybrid cloud.

As shown in FIG. 2, data storage 204 may be provisioned with software components that enable the computing device 200 to carry out the operations disclosed herein. These software components may generally take the form of program instructions that are executable by the processor 202 to carry out the disclosed functions, which may be arranged together into software applications, virtual machines, software development kits, toolsets, or the like, all of which are referred to herein as a software tool or software tools. Further, data storage 204 may be arranged to store project-related data in one or more databases, file systems, or the like. Data storage 204 may take other forms and/or store data in other manners as well.

Communication interface 206 may be configured to facilitate wireless and/or wired communication with configured other computing devices or systems, such as one or more client stations 112 when computing device 200 serves as back-end computing platform 102, or as back-end computing platform 102 when computing device 200 serves as one of client stations 112. As such, communication interface 206 may take any suitable form for carrying out these functions, examples of which may include an Ethernet interface, a serial bus interface (e.g., Firewire, USB 3.0, etc.), a chipset and antenna adapted to facilitate wireless communication, and/or any other interface that provides for wireless and/or wired communication. Communication interface 206 may also include multiple communication interfaces of different types. Other configurations are possible as well.

Although not shown, computing device 200 may additionally include one or more other interfaces that provide connectivity with external user-interface equipment (sometimes referred to as "peripherals"), such as a keyboard, a mouse or trackpad, a display screen, a touch-sensitive interface, a stylus, a virtual-reality headset, speakers, etc., which may allow for direct user interaction with computing device 200.

It should be understood that computing device 200 is one example of a computing device that may be used with the embodiments described herein. Numerous other arrangements are possible and contemplated herein. For instance, other computing devices may include additional components not pictured and/or more or fewer of the pictured components.

III. EXISTING COLLABORATIVE MODELS

As mentioned above, existing models for managing data created and stored on a construction management application are typically account-centric. In other words, projects and related project data are created, stored, and maintained under a single given account.

Figure 3:
FIG. 3 depicts a diagram of a relationship structure according to an account-centric collaborative model for enabling collaboration between parties related to a construction project.
Figure 3:
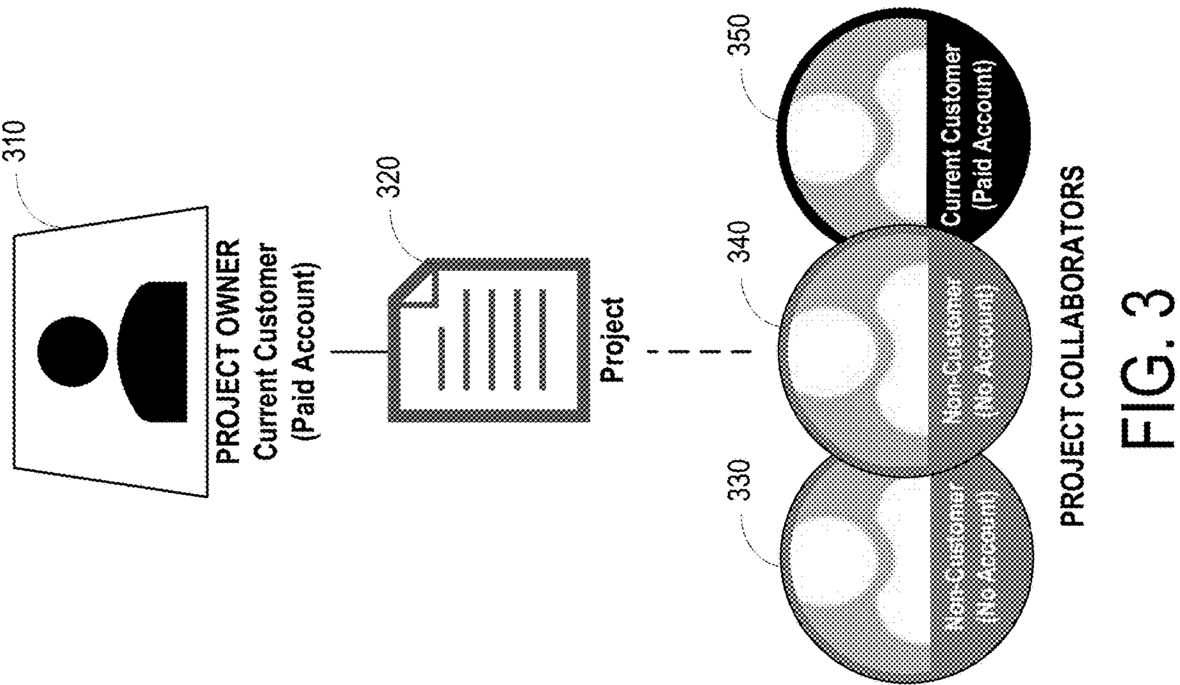

To illustrate, FIG. 3 depicts a diagram 300 of a data management structure according to the existing account-centric collaborative model typically employed by construction management software applications. A party that is a current customer of the construction management application and owns an account may create one or more projects. Each project, and all subsequently created data related to that project, is then stored under the creating party's account. For example, a project owner 310 may create a project 320, which is stored under the account owner's existing customer account. The project owner 310 may then invite other parties, who may or may not have existing accounts, to collaborate on the project 320. As shown in FIG. 3, collaborators 330 and 340 may not be customers of the construction management application and thus may not have existing accounts. After being invited to the project 320, in order to access and collaborate on the project 320, each of the collaborators 330 and 340 may need to create a basic free account, then log into their respective account and enter the project details for project 320 (e.g., project name, information about account owner 310, etc.) to locate the project and accept account owner 310's invitation to access project 320. Collaborator 350 may be a customer of the construction management application and thus may have an existing account. In order to access the project, collaborator 350 may log into its existing account and enter the project details to locate the project and accept account owner 310's invitation to access project 320.

As mentioned above, under the existing approach, data management is based on an account-centric model such that all data created under a construction project is created, stored, and maintained under a single account—namely, the project owner's account. This presents several drawbacks. As one example, because all data related to the collaboration between the project owner and the collaborators is stored under the owner's account, a collaborator may not have an allocated space within the project to create and edit data privately. For example, the collaborator may be unable to record any confidential information that the collaborator may not wish to share with the project owner. Furthermore, a collaborator may have limited to no capability to communicate or share data with other collaborators.

As another example, because project data related to a given project is stored under the project owner's account, collaborators may have little to no retention rights with respect to the data resulting from their collaboration on the given project. Typically, in the event that a collaborator's access to a project is revoked (e.g., the project owner deletes the project after completion, or the owner and collaborator disagree and the owner removes collaborator from the project, etc.), the collaborator has no retention rights to the project and is thereafter unable to access or retain, in any capacity, data that the collaborator created or contributed to during the collaboration. As a result, a collaborator typically loses all access to project data that it has created, revised, or otherwise collaborated on throughout the duration of a given project. This can be problematic for various reasons. As one example, a collaborator may wish to make use of data it has created or otherwise collaborated on in the future for their own independent business purposes (e.g., to inform the collaborators' actions at a future time regarding a construction project that does not involve the project owner). However, because a collaborator is unable to retain data stored in the project owner's account, it may be unable to preserve such information. Other examples are also possible.

In order to preserve given project data from a given project, a collaborator would need to create its own account with the construction management application and create a new version of the given project data under its own account. This presents several drawbacks. First, if the collaborator is using a basic account to access the project, the collaborator will typically not have access to the tools required to create a new project and related project data. Therefore, the collaborator may need to purchase an account with the construction management application. However, the collaborator may not require a long-term subscription to the service offered by the construction management application, and investing in a paid account for the sole purpose of re-creating project data may not be worthwhile or economically feasible. Second, to maintain an accurate version of original project data, the collaborator would need to update the new version of the original project data every time the original project data is revised, which may be cumbersome and time-consuming and result in some revisions to the original project data being overlooked when updating the new version of the given project data in the collaborator's account. Third, any confidential information the collaborator wishes to record in relation to an original given data object of the given project would be stored within the collaborator's account and would not be linked to the original given data object. As such, the collaborator would be unable to refer to the confidential information when viewing the original given data object in the project owner's account. Furthermore, the collaborator may not be able to share the confidential information with another collaborator. To illustrate with an example, a subcontractor collaborator may wish to create, with respect to an original data object, such as a punch item, a related data object, such as a note, in order to record confidential information that he does not wish to share with the project owner. As a collaborator, the subcontractor may not have access permissions required to create private data objects within the project owner's account. The subcontractor would thus need access to an independent account (i.e., the collaborator's own paid account) to then create a new version of the given project, create a new version of the original punch item, and then create the confidential note related to the original punch item.

As discussed above, one way to address these concerns is to enable user accounts to be "mirrored" such that data objects can be copied and shared with other user accounts. However, this data mirroring approach leaves some of the aforementioned drawbacks unaddressed, such as the inability of a collaborator to create and share confidential child data objects in a way that allows the child data objects to be associated with their original parent data objects. Additionally, the data mirroring approach presents its own drawbacks. First, this approach requires each collaborator to recreate an instance of the project in its own respective account and then create an instance of each data object on which to collaborate so that the instances of those data objects may then be linked and mirrored across the accounts of the project owner and the collaborators. Second, this approach requires the back-end platform running the construction management SaaS application to maintain a copy of each instance of each data object that has been selected for mirroring, which may result in the back-end platform maintaining multiple copies of various data objects. Maintaining multiple instances of a given data object may result in an inefficient use of platform resources. Further, maintaining multiple instances of a given data object may increase the likelihood of one or more updates to a given data object failing to propagate across all linked accounts. Further yet, multiple instances of a given data object may increase the difficulty of identifying an original instance or a single source of truth of a given data object. Third, this approach does not facilitate live collaboration such that one or more parties may view, edit, or otherwise collaborate on a specific data object in real-time within the SaaS application.

Therefore, there remains a need for technology that enables efficient management of data and facilitates collaboration between multiple parties on a construction project in a manner that protects data integrity and allows for flexible and/or customized definition of access permissions and data retention settings.

IV. EXAMPLE COLLABORATIVE MODEL

To help address the above-mentioned and other challenges with existing collaborative models, disclosed herein is an improved data management and collaborative model that may be employed by a construction management SaaS application for managing data and enabling improved collaboration between parties related to a construction project.

At a high level, the disclosed data management and collaborative model for managing data facilitates improved collaboration between multiple parties collaborating on a construction project and facilitates improved data management of data related to the construction project. Under the disclosed approach, data related to a given construction project may be stored as an independent entity separately from any one party's account, including the account of the party who created the project. This approach helps maintain a single source of truth for project data related to a given construction project. Furthermore, this approach enables independent connections to be established between a data entity that represents a given construction project and one or more other data entities representing a party or project data such that any given connection can be created or removed without impacting the data structure of the data entity of the given construction project.

a. Parties and Connections

The disclosed data management and collaborative model may facilitate improved collaboration between multiple parties in various ways. As one possibility, the disclosed collaborative model may provide for improved flexibility and customization with respect to the data structure of a party's account. In general, a party may be represented by a data entity that is encoded with data including relevant information about the party. Such information may take various forms.

One example of relevant information about a party may include information regarding a real-world entity that is represented by the party. In this regard, a party that has an account with a construction management SaaS application may represent an individual (e.g., a human user) or a company (e.g., a business entity). A party that represents an individual (also referred to herein as an individual-party) may be managed by the individual. For example, a party that represents an employee of a construction company may be managed by the employee himself. An account of a party that represents a company (also referred to herein as a company-party) may also be managed by an individual. For example, a given company having a construction management SaaS application account that represents the company may have a designated employee (e.g., account manager) who is responsible for managing the account of the given company and performing various tasks on behalf of the company via the company's account. A party may represent other entities as well.

A party may be designated as representing an individual or a company in various ways. As one example, a party may have been designated as an individual-party or a company-party at the time that the party created and/or registered its account with the construction management application. As another example, a party may have been designated as an individual-party or a company-party when registering with a different system or service, and those registration details may be imported by the construction management SaaS application during the process of the party creating and/or registering an account with the construction management SaaS application.

Information regarding a real-world entity represented by a party may take various forms. As one example, information regarding a party that represents an individual may include contact information, photographic information, employer information, data access permissions and retention settings, and/or other information pertaining to the individual. Furthermore, a party that represents an individual may be associated with a given user role, which may reflect the individual's job function or job title. In that regard, a party's general access permissions and retention settings may be assigned or modified using role-based access permissions. Role-based access permissions may comprise a set of predetermined settings associated with a given party role or department (e.g., administrator, manager, contractor, finance, legal, etc.) that may be assigned to a party. Role-based access configuration may be particularly useful when defining access permissions settings for multiple parties in a similar way. For example, if a party representing a company wishes to configure access permissions and/or retention settings for multiple other parties representing individuals (e.g., employees of the company) with whom the party is linked, the party may configure access permissions and/or retention settings for one or more groups of the multiple other parties using role-based configuration. As another example, a party that represents a company may include contact information, location information, website/social media information, and/or other information pertaining to the company. Furthermore, a party that represents a company may be associated with a given company role, which may further be associated with a certain set of general access permissions and retention settings.

As another possibility of facilitating improved collaboration between multiple parties, the disclosed collaborative model may provide improved capability for parties to interact with each other. In one aspect, a party may "connect" with one or more other parties. In practice, such a "connection" may be formed by a first party navigating to a given view of a graphical user interface ("GUI") provided by a construction management software application employing the disclosed model and utilizing one or more GUI tools that enables the first party to connect with a second party. In turn, the computing platform running the construction management software application may establish a connection between the first party's data entity and the second party's data entity. Each connection between two parties may be associated with respective connection data that includes information about the connection (e.g., when the connection was established, etc.), information about each party, and information about the parties' relationship (e.g., employer-employee, etc.). Such connection data may be stored independently from either party's data entity. In this way, changes may be made to a given connection without impacting (or impacting to a minimal degree) the data entity of a party with which the connection is established. For example, if a first party decides to sever its connection with a second party (e.g., Employee A no long works at Company B and removes its connection to Company B), the computing platform may simply delete the connection between the first and the second parties, leaving each party's respective data structure intact. In a similar way, a respective connection may be established between a party and one or more other data entities, such as a project entity or a data object entity, as will be explained in more detail further below.

As one example of establishing a connection with another party, a party representing a company may connect with one or more other parties. For example, a company-party may connect with one or more individual-parties associated with the company party (i.e., employees of the company). Furthermore, the company-party may configure, for each associated individual-party, respective access permissions and/or retention settings that may include a broad scope of tools and features of the construction management SaaS application that the associated individual-party may access (e.g., products and services of the application that the company's employee can access and utilize). Such information regarding access permissions and/or retention settings may be encoded in respective connection data associated with the connection between the company-party and each individual-party. The tools and features accessible by a given party may include a project creation tool that may be used to create a project entity and related data object entities for a given construction project, as will be explained in more detail further below.

As another example of establishing a connection with another party, a first company-party may connect with at least a second company-party. Each of the first and second company-parties may further be connected to a respective set of individual-parties (i.e., respective employees of each company). Each individual-party within the respective sets may further be connected with each other and/or with various other parties representing other individuals and/or companies. Each connection that is established between any two parties may be associated with respective connection data that includes information about the two parties and their relationship (e.g., company-employee, company-company, employee-employee, etc.). Connections between parties may thus be created, altered, or removed without affecting the data structure of any party's respective account. Furthermore, in this way, parties may easily connect, communicate, or share information with each other in various capacities. For example, parties may use various tools provided by the construction management SaaS application to collaborate electronically on a given construction project.

Further, a party may also connect with one or more parties that are not existing customers of the construction management application. In this regard, initiating a connection with a non-customer collaborator may provide the non-customer collaborator with an option to create a free guest account, which may be beneficial for various reasons. As one example, current customers of the construction management application may be provided with an expanded scope of potential collaborators for a given construction project. As another example, non-customers may be provided with an opportunity to explore the services provided by the application in order to determine if the service would be beneficial to them. Third, providing non-customers with their own accounts provides all collaborators of a given project with equal access to tools and features provided by the application. Other examples are also possible.

b. Project Entities

In addition to facilitating improved collaboration between multiple parties, the disclosed model may facilitate improved management of data related to a given construction project. A construction project may be represented within a construction management SaaS application by a data entity that is encoded with data including relevant information about the project, herein referred to as a "project entity." A project entity may be accessed by and collaborated on by one or more parties.

The creation of a project entity by a party (i.e., a party having a paid account with the construction management SaaS application) may establish a first connection between the project entity and the creating party. Similarly, when additional parties subsequently access the project entity, a new respective connection between the project entity and each additional party may be established.

Figure 4:
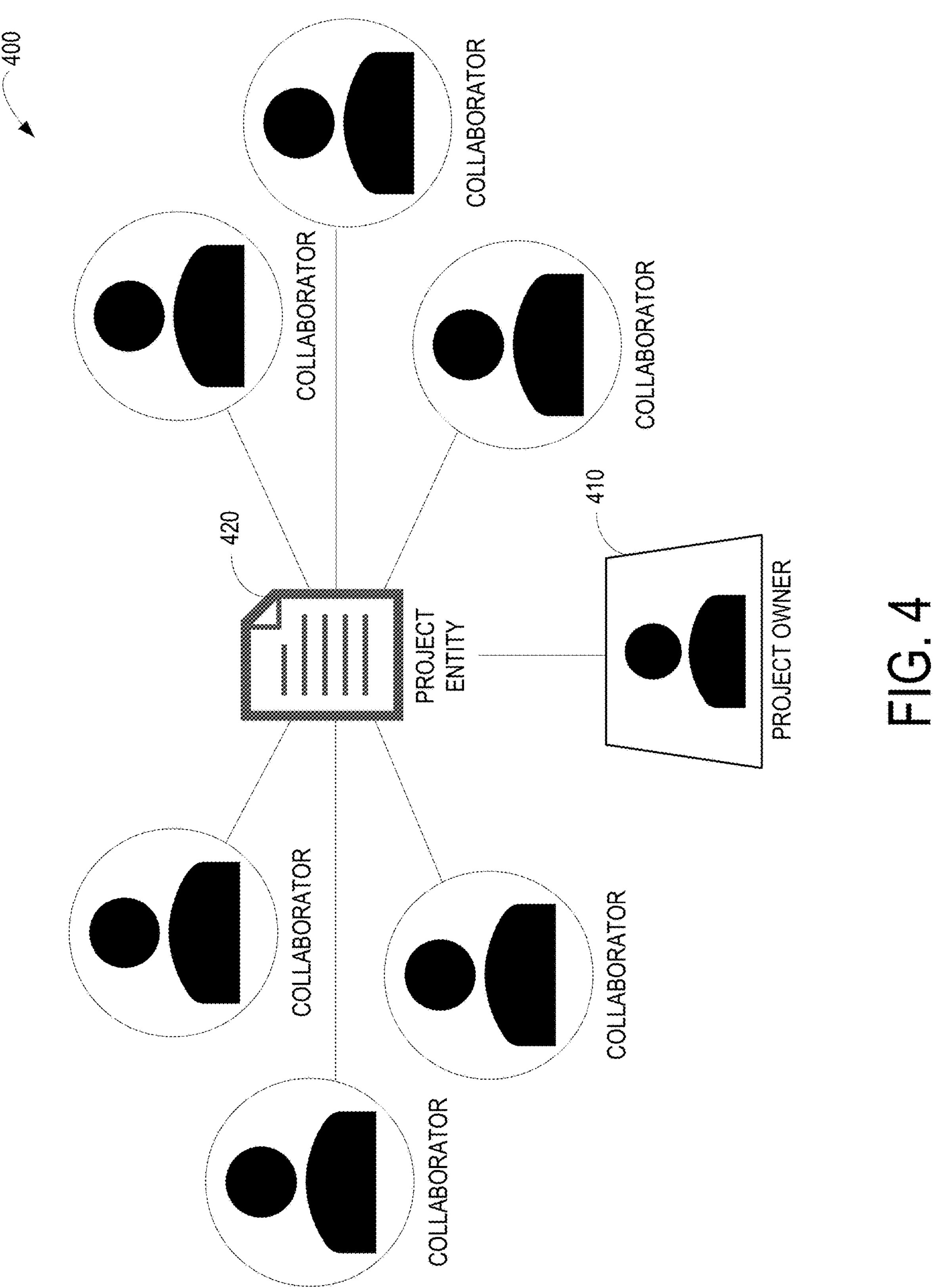
FIG. 4 depicts an example diagram of a relationship structure according to the disclosed model for managing data for and enabling collaboration of parties related to a construction project.

To illustrate, FIG. 4 depicts an example data structure 400 of the disclosed project-centric data management model. A project owner 410 may create a project entity 420 that represents a given construction project. As shown in FIG. 4, the project entity 420 may be stored as an independent entity within the SaaS application rather than an entity within the account of project owner 410. Creation of the project entity 420 may establish a connection between the project owner 410 and project entity 420. The connection may be associated with connection data that includes the project owner's default data access permissions and data retention settings with respect to the project entity.

Project owner 410 may then invite one or more additional parties, or collaborators, to access and collaborate on the project entity 420. As will be discussed in more detail below, an invitation from the project owner 420 to each collaborator may include a respective, collaborator-specific set of default collaboration settings (e.g., default data access permissions and data retention settings for the collaborator) with respect to the project entity 420. Each collaborator's acceptance of the project owner's invitation to access project 420 (thereby agreeing to the default collaboration settings) may in turn establish a respective connection between the collaborator and project entity 420. Each respective connection may be associated with respective connection data that includes the collaborator's respective default data access permissions and data retention settings with respect to the project entity.

A project entity may be associated with one or more additional data entities, herein referred to as data object entities or data objects, that may be created in relation to (or "under") the project entity. All of the data objects created under a project entity may collectively represent the "project data" related to the project entity. A data object may take various forms.

As one possibility, a data object may take the form of an "object" data entity (herein referred to as an object entity), which may represent data that can be collaborated on by one or more parties. An object entity may be a tool offered by the construction management application, such as an RFI or a Punch List, among other examples. An object entity may also be an object within a tool, such as a Submittal, or a Bid Package, among other examples. An object entity may take the form of a document (e.g., a legal contract, a form, a budget, etc.), a drawing file (e.g., a schematic, a blueprint, etc.), an image file, or a template (e.g., a project template, a permissions template, etc.). Other examples are also possible.

As another possibility, a data object may take the form of a "field" data entity (herein referred to as a field entity), which may represent specific data within, or related to, a given object entity. A field entity may take the form of data such as a comment, an annotation, a chat, etc., among other possibilities. For example, a field entity may take the form of a note or a comment on a given contract. As another example, a field entity may take the form of a redlined markup on a given document. As yet another example, a field entity may take the form of information entered into a field of fillable form. Other examples are also possible.

The creation of a data object under a project entity may further establish respective connections between (i) the data object and the project entity, (ii) the data object and the party creating the data object, (iii) if the data object is related to a second data object (e.g., a field entity created under an object entity), the data object and the second data object, and (iv) the data object and each party invited to collaborate on the data object (e.g., each party with whom the data object is shared).

As mentioned above, any given connection may have associated connection data that includes relevant information about the given connection. Connection data for a given connection may be created and stored at the time the connection is established, as will be discussed in more detail further below. Further, as mentioned above, connection data may be stored independently of the data structure of any given data entity, thereby allowing the data structure of the given data entity (e.g., the project entity or the data object) to remain unaffected by changes to a given connection. For example, data related to a project entity or a data object may be stored with the data structure of the project entity or the data object itself, whereas connection data for one or more connections of the project entity or the data object may be stored separately while still associated with the project entity or the data object. In this way, connections may be created or removed from a given project entity or a given data object without impacting the data structure of the given project entity or the given data object.

Connection data associated with a given connection may include various information. As one possibility, connection data may include information about data access permissions and retention settings. For example, connection data associated with a connection between a given party and a project entity may include information about the given party's defined access permissions and retention settings for the project entity. As another example, connection data associated with a connection between the given party and a given data object may include information about the given party's defined access permissions and retention settings for the given data object, which may be different from the party's defined access permissions and retention settings for the project entity. Defining access permissions and retention settings will be discussed in more detail further below.

As another possibility, connection data may include information about how two data entities are related. For example, connection data associated with a connection between a given party and a project entity may include information about the given party's role with respect to the project entity (e.g., owner, creator, collaborator, etc.). As another example, connection data associated with a connection between the given party and a given data object may include information about the given party's role with respect to the given data object (e.g., owner, creator, collaborator, etc.). As yet another example, connection data associated with a connection between a first data object and a second data object may include information about how the first and second data objects are related.

As yet another possibility, connection data may include historical information about one or more data entities. Such information may be used to track and/or monitor data related to a given project entity, a given data object, or a given party. Connection data may include other information as well.

In general, a party that has established a connection with a given project entity may be a project owner or a project collaborator. A project owner may be a party that is designated as a party responsible for managing and overseeing the construction project represented by the given project entity. Therefore, a project owner may have a unique set of default access permissions and retention settings that may be automatically granted to the project owner at the time of creating a project entity. For example, the project owner may have access to a set of tools and features that provide the owner with the capability to perform unilateral actions regarding the project entity. Such owner-specific actions may include sharing the project entity with one or more parties (e.g., inviting other parties to access and collaborate on the project entity). Owner-specific actions may further include configuring, for each collaborator that is invited to collaborate on the project entity, a respective set of default access permissions and retention settings. Owner-specific actions may additionally include determining the visibility of the project entity within the construction management application. For example, the project owner may be able to set the visibility of the project entity to a private mode, such that only invited parties may access it, or a public mode, such that any party may be able to see the project entity within the construction management application and request access to collaborate on it, even if the party has not been specifically invited to the project entity. Other visibility options are also possible. Still further, owner-specific actions may include the ability to archive the project entity and/or related project data or delete the project entity and/or related project data. Owner-specific settings may also include other possibilities.

Furthermore, a given project entity may have more than one project owner. For example, if Construction Company A and Construction Company B are both jointly responsible for managing construction of a Museum, Construction Company A may create a project entity representing the construction project for Museum and designate Construction Company B as an additional project owner.

A project collaborator may be a party that is invited to access and collaborate on an existing project entity. As discussed above, a project collaborator may represent an individual or a company. In this regard, when a project owner invites a given collaborator that represents a company to collaborate on a given project entity, the project owner may configure the given collaborator's general access permissions in a way that allows the given collaborator to invite additional collaborators (e.g., one or more of the company's employees) to collaborate on the project entity. The project owner may further configure the given collaborator's permissions such that the given collaborator may configure, for each additional collaborator that the given collaborator invites to collaborate on the project entity, a respective set of default access permissions and retention settings.

A collaborator may generally be bound by a set of default access permissions and retention settings that have been configured by the project owner specifically for the collaborator. However, in some instances, a collaborator's default access permissions and retention settings may be modified by the project owner during the course of a project. In some instances, a collaborator may also renegotiate or request to modify its default access permissions and retention settings.

c. Creating a Project Entity

In practice, to create a new project entity for a given construction project and configure collaborator access permissions and retention settings, a project owner (e.g., a user that represents the project owner) may access the construction management SaaS application via a client station (such as one of the client stations 112) that communicates with a back-end computing platform (such as the back-end platform 102) running the SaaS application. The project owner's client station may present a graphical user interface ("GUI"), which the project owner may use to navigate to a project creation tool for requesting creation of a new project entity that represents the given construction project. The project owner may then be displayed with one or more GUI views prompting the project owner to input various information that may be required in order to create the project entity.

The computing platform may cause the project owner's client station to display a view prompting the project owner to input information identifying the given construction project, such as a project name and location. In order to prevent creation of duplicate project entities, the identifying information may be used by the computing platform to conduct a threshold query to determine if a project entity for the given construction project already exists. If the computing platform determines that the requested project entity is not unique and a similar project entity (e.g., a project entity with the same identifying information) already exists, the project owner may be prompted to modify the project entity information in order to create a unique project entity. Alternatively, or additionally, the project owner may be presented with an option to request access to the existing project entity.

After determining that the requested project entity is unique, the computing platform may cause the project owner's client station to display a view prompting the project owner to confirm that it is, in fact, a project owner of the project represented by the project entity. In some instances, a party other than the project owner may initiate the project entity creation process. For example, an employee of a construction company who is responsible for creating new project entities for the construction company's construction projects may have initiated the project creation process using an individual account. In such instances, when the party creating the project entity is not the project owner, the party may input information indicating that the party is not a project owner and may instead identify a different party who should be designated as the project owner. The computing platform may then save the project details received thus far and send a notification to the identified project owner to complete setup of the project entity—that is, to configure access permissions and retention settings for one or more collaborators and invite the one or more collaborators to access the project entity. Continuing the example above, the employee may designate the construction company as the project owner and input the construction company's account information. The computing platform may then send a notification to the construction company's account to complete setup of the project entity. Otherwise, the project owner may confirm that it is the project owner and proceed.

The computing platform may then cause the project owner's client station to display one or more views prompting the project owner to input data defining a set of collaborator-specific, default access permissions and retention settings for one or more collaborators who will be invited to access the project entity. Access permissions may define what project data a collaborator may access and what actions the collaborator may perform with respect to that project data. Retention settings may define the collaborator's right to retain a copy of project data in the event that the collaborator's access to the project data is revoked (e.g., when collaboration between the project owner and the collaborator has ended). The collaborator's default access permissions and retention settings may be configured to apply to all types of data objects. Alternatively, the collaborator's default access permissions and settings may be configured such that different settings may apply to different types of data objects. In some implementations, the project owner may be able to configure default settings for more than one collaborator at a time and collectively send respective invitations to those collaborators. Further, in some implementations, the project owner may proceed to complete creation of the project entity without configuring collaborator settings, deferring to do so until a later time.

A project owner may configure a given collaborator's default access permissions settings in various ways. In one aspect, the project owner may define whether the given collaborator may invite other collaborators to access the project entity. For example, as discussed above, a party may represent a company or an individual. In this regard, a project owner may invite a company-party and/or an individual-party to collaborate on a given project entity. In an instance where a given collaborator is a company-party, the project owner may configure the given collaborator's access permissions such that the given collaborator may invite additional collaborators that are affiliated with the given collaborator (e.g., the company may invite one or more of its employees to access the project). In this regard, when granting the given collaborator permission to invite additional collaborators, the project owner may further configure the given collaborator's settings such that the given collaborator's default access permissions and data retention settings may automatically propagate to any additional collaborator that the given collaborator invites to access the project entity. Alternatively, the project owner may configure the given collaborator's access settings such that the given collaborator may configure the access permissions and retention settings for each additional collaborator that the given collaborator invites to the project entity, to the extent that the additional collaborators' settings may not surpass (e.g., exceed the scope of) the given collaborator's settings.

In another aspect, the project owner may define a scope of access for a given collaborator with respect to project data related to the project entity. The scope of access may include what project data (e.g., what types of data entities) the given collaborator may access and what actions the given collaborator may perform with respect to accessible project data. Permissible actions may include, among other examples, the ability to create, read, update, delete, or share data. The project owner may define the scope of access in various ways. As one possibility, the project owner may define the scope of access based on different levels of access. As one example, "full" access permissions may permit the given collaborator to access all project data related to the project entity and perform all permissible actions with respect to the project data. As another example, "limited" access permissions may permit the collaborator to access only project data that is specifically shared with the given collaborator and perform only certain permissible actions with respect to that project data. The project owner may further specify what type of project data the collaborator may access and what specific actions the collaborator may perform with respect to that project data.

To illustrate with an example, Construction Company may create a new project entity for "Project Museum," of which Construction Company is a project owner. Construction Company may wish to invite Architect and General Contractor to collaborate on Project Museum. Construction Company may wish to configure each collaborator's access permissions and retention settings based on each collaborator's respective project tasks. For instance, Construction Company may configure Architect's access permissions and retention settings such that Architect may create, read, and edit schematics. Further, Construction Company may configure General Contractor's access permissions and retention settings such that General Contractor may (i) read schematics and (ii) read and edit RFIs and punch lists.

In yet another aspect, the project owner may configure a collaborator's access permissions to take effect at a given time. As one example, the collaborator's access permissions may take effect at the time the collaborator accepts the project owner's invitation to collaborate on the project entity. As another example, the project owner may configure the given collaborator's access permissions settings so as to take effect at a given date and/or time. For example, the project owner may configure a first collaborator's access permissions so as to permit access to the project entity beginning on date X, which may correspond with commencement of a first given project task for which the first collaborator is responsible. In such an instance, the first collaborator may be unable to access the project entity, even after accepting the invitation, until date X. The project owner may then configure a second collaborator's access permissions so as to permit access to the project entity beginning on date Y, which may correspond with commencement of a second given project task for which the second collaborator is responsible. In such an instance, the second collaborator may be unable to access the project entity, even after accepting the invitation, until date Y. Other ways of configuring access permissions settings are also possible.

After inputting data defining the collaborator's access permissions settings, the project owner may proceed to input data defining the collaborator's retention settings with respect to the data accessible to the collaborator. In some implementations, the project owner may define both access permissions and retention settings simultaneously. The project owner may configure a collaborator's default retention settings in various ways. In general, data retention rights may be categorized into three levels: full retention, limited retention, and no retention. Having full retention rights may permit a collaborator to retain access to previously accessible project data in a read/write capacity, such that the collaborator retains access to an editable copy of the project data. Having limited retention rights may permit the collaborator to retain access to previously accessible project data in a limited capacity, such that the collaborator retains access to a read-only copy of the project data. Having no retention rights may prevent the given collaborator from retaining access to previously accessible project data in any capacity. As mentioned above, retention settings may be defined with respect to all types of data objects or may be defined differently with respect to different types of data objects.

To illustrate using the Project Museum example above, Construction Company may configure Architect's data retention settings to be set to "limited retention" with respect to schematics such that after collaboration between Construction Company and Architect has ended, Architect may retain a read-only copy of the schematics. Further, Construction Company may configure General Contractor's data retention settings to be set to "no retention" with respect to schematics and "limited retention" with respect to RFIs and punch lists such that after collaboration between Construction Company and General Contractor has ended, General Contractor (i) may not retain a copy of schematics and (ii) may retain a read-only copy of RFIs and punch lists.

In the manner described above, the project owner may define default access permissions and retention settings for one or more collaborators that will be invited to access the project entity. After receiving the data defining the default access permissions and retention settings for the one or more collaborators, the computing platform may cause the project owner's client station to display a view prompting the project owner to input contact information for each of the one or more collaborators to invite the one or more collaborators to access the project entity. In an implementation where configuring collaborator settings has been deferred, the step of inviting collaborators may also be deferred until collaborator settings are defined.

After receiving the information required to create the project entity, the computing platform may proceed to create the project entity. The computing platform may then cause the project owner's client station to display an indication that the project entity has been created. In conjunction with creating the project entity, or immediately succeeding creation of the project entity, the computing platform may perform certain additional actions related to creation of the project entity. The computing platform may establish a connection between the project owner and the project entity. Furthermore, the computing platform may generate connection data associated with the connection between the project owner and the project entity. Such connection data may include the project owner's default access permissions and retention settings with respect to the project entity. Still further, the computing platform may send to the previously identified one or more collaborators a respective invitation to collaborate on the project entity. Each collaborator's respective invitation may include a description of the collaborator's respective default access permissions and retention settings for the project entity as configured by the project owner. Accepting the invitation to collaborate on the project entity may require each collaborator to accept its respective default access permissions and retention settings.

In some implementations, the computing platform may first create the project entity after the project owner has completed inputting the data required to create the project entity and then cause the project owner's client station to display additional actions that the project owner may take with respect to the project entity. Such actions may take various forms. As one possibility, the project owner may be prompted with an option to configure access permissions and retention settings for one or more collaborators and invite the one or more collaborators to access the project entity. As another possibility, the project owner may be prompted with an option to create one or more data objects under the project entity. Other options are also possible. Furthermore, the process of configuring access permissions and retention settings for a given collaborator and inviting the given collaborator to access the project entity may also be initiated at any time after a project entity has been created.

When a given collaborator accepts an invitation to collaborate on a project entity, the computing platform may receive an indication that the given collaborator has accepted the invitation. As mentioned above, a collaborator's acceptance of an invitation to collaborate may require the collaborator to also accept (e.g., agree to) the collaborator's default access permissions and retention settings for the project entity as defined by the project owner. In some implementations, if a collaborator is dissatisfied with the default access permissions and retention settings that have been configured by the project owner, the collaborator may propose alternative settings prior to accepting the invitation to collaborate.

In turn, after receiving the indication that the given collaborator has accepted the invitation and the default access permissions and retention settings for the project entity, the computing platform may (i) establish a connection between the given collaborator and the project entity, (ii) define, as the given collaborator's general access permissions and retention settings for the project entity, the default access permissions and retention settings for the project entity as configured by the project owner, and (iii) generate and store connection data, associated with the connection between the given collaborator and the project entity, that includes the given collaborator's defined access permissions and retention settings for the project entity. In some instances, the project owner may have created a set of data objects under the project entity (as will be discussed further below) by the time the given collaborator has accepted the invitation to collaborate. In such instances, the given collaborator's default access permissions and retention settings may also be applied to each existing data object in the set of data objects. Therefore, for each existing data object, the computing platform may further (iv) establish a connection between the given collaborator and the existing data object, (v) define, as the given collaborator's general access permissions and retention settings for the existing data object, the given collaborator's default access permissions and retention settings for the project entity, and (vi) generate and store connection data, associated with the connection between the given collaborator and the existing data object, that includes the given collaborator's defined access permissions and retention settings for the existing data object. At a subsequent time, when collaboration between the given collaborator and the project owner ends, the computing platform may use the given collaborator's stored data retention settings with respect to a given data object to implement the given collaborator's retention rights for the given data object.

Turning now to FIG. 5, an example series 500 of GUI views is depicted. Example series 500 may be presented to a party upon requesting creation of a new project entity for a given construction project via a project creation tool of a construction management SaaS application employing the disclosed data management and collaborative model. Series 500 may be presented via a GUI at the party's client station by a back-end computing platform running the construction management SaaS application.

The series of GUI views may begin with view 510, where the party may be presented with a view prompting the party to input information regarding the given construction project. For example, the party may be prompted to enter a project name, project address, and project type for the given construction project. The party may also be prompted to enter a current project phase, examples of which may include phases such as "Negotiation," "Planning & Design," or "Construction." The view 510 may prompt the party to input other information as well.

After inputting the project details, the party may select an option to proceed. For example, as shown in view 510, the party may select a GUI button "Next" to proceed. In turn, after receiving an indication from the party's client station that the party has completed inputting project information and selected an option to proceed to the next view, the computing platform may cause the party's client station to present a view 520.

The view 520 may present the party with a prompt to confirm if it is the project owner. As discussed above, in some instances, a party other than a project owner may initiate the project entity creation process. In such instances, when the party creating the project entity is not the project owner, the party may input information indicating that the party is not a project owner and may instead identify a different party who should be designated as the project owner. As shown in view 520, if the party is not the project owner, the party may select an option "No" and proceed to a view where the party may be prompted to input details for a different party that should be designated as the project owner. Otherwise, the party may select an option "Yes" to confirm that it is the project owner. While not shown in 520, as discussed above, the party may additionally have an option to designate one or more additional parties as project owner. Each additional project owner may have the same default access permissions and retention settings as the party with respect to the project entity.

After confirming that it is the project owner, the party may select an option to proceed to the next view. For example, as shown in view 520, the party may select a GUI button "Next" to proceed. In turn, after receiving an indication from the party's client station that the party has confirmed that it is the project owner and selected an option to proceed to the next view, the computing platform may cause the party's client station to present a view 530.

The view 530 may include a set of selectable options that the party may use to configure collaboration settings (i.e., the default access permissions and retention settings) for one or more collaborators that will be invited to access the project entity. As shown in view 530, the party may select a scope of access permissions with respect to various types of data objects. While not shown in view 530, the party may similarly configure retention settings for the one or more collaborators.

After configuring the collaboration settings for the one or more collaborators, the party may select an option to proceed to the next view. For example, as shown in view 530, the party may select a GUI button "Next" to proceed. In turn, after receiving an indication from the party's client station that the party has completed configuring collaborator settings and selected an option to proceed to the next view, the computing platform may cause the party's client station to present a view 540.

The view 540 may present the party with one or more options for selecting a visibility level within the SaaS application for the given construction project represented by the project entity. For example, the party may select a "Public" visibility level, such that the given construction project may be visible to any party having an account with the SaaS application. This may allow parties that have not been specifically invited to access the project entity to request access to collaborate on the project entity. As another example, the party may select a "Private" visibility level, such that the given construction may be visible to only those parties that have been specifically invited to access the project entity. Other visibility options may also be possible.

After setting a visibility level, the party may select an option to proceed to the next view. For example, as shown in view 540, the party may select a GUI button "Next" to proceed. In turn, after receiving an indication from the party's client station that the party has completed setting a visibility level and selected an option to proceed to the next view, the computing platform may cause the party's client station to present a view 550.

The view 550 may prompt the party to input data identifying the one or more collaborators that will be invited to collaborate on the project entity. For example, as shown in view 550, the party may be prompted to input contact information for each of the one or more collaborators. After inputting the contact information for the one or more collaborators, the party may proceed to select an option to cause the computing platform to send a respective invitation to each collaborator. For example, as shown in view 550, the party may select a GUI button "Invite." In turn, the computing platform may proceed to send to each identified collaborator an invitation to collaborate on the project entity. Additionally, or alternatively, the party may select an option, such as the GUI button "Not now," which may cause the computing platform to save the collaborator details that have been provided by the party and send the collaborator invitations at a later time. Still additionally, or alternatively, the party may select an option to retrieve a link, or some other pointer, which the party may use to independently invite the one or more collaborators to collaborate on the project entity.

The computing platform may receive the data inputted by the party throughout each of the views 510-550 at various times. For example, the computing platform may receive data inputted at a given view each time the party selects an option to proceed to a next view. As another example, the computing platform may collectively receive all of the data inputted at each view after the party has completed the process of creating a project entity, defining access permissions and retention settings, and inviting one or more collaborators. One of ordinary skill in the art will appreciate that the party's client station and the computing platform may communicate at various other times as well.

d. Creating a Data Object

As mentioned above, after a project entity has been created, a project owner may create a set of data objects under the project entity. The set of data objects may include one or more data objects that may be created by the project owner throughout the duration of the project.

The process for creating a new data object as a project owner may be similar to the process for creating a project entity. In practice, a data object creation tool may be presented to the project owner as an additional action that may be taken after completing the request for creation of a project entity. Additionally, or alternatively, at a time after the project entity has been created, the project owner may navigate to a view presenting the data object creation tool and proceed to create a new data object at any time during the course of the project.

After the project owner initiates the object creation tool, the computing platform may cause the project owner's client station to display a series of GUI views that may prompt the project owner to input information required to create the data object.

The computing platform may cause the project owner's client station to display an initial view prompting the project owner to input information identifying an existing project entity under which the new data object should be created. For example, the project owner may identify an existing project entity by selecting the existing project entity from a displayed list or by inputting information identifying the existing project entity, among other possibilities. In an instance where a new data object is related to an existing data object (e.g., the new data object is a field entity related to a given object entity), the project owner may further identify the existing data object under which the new data object should be created. In some implementations, the project owner may be prompted to first create the new data object and then identify one or both of an existing project entity or an existing data object with which the newly created data object is related.

After identifying an existing project entity and/or data object under which the new data object should be created, the project owner may be prompted to confirm that it is the owner of the data object. The project owner may input information indicating that it is the owner, transfer ownership to a different party, or designate a second party as an additional owner of the data object. In some implementations, the computing platform may forgo this step and instead automatically designate the project owner as the owner of the new data object.

The computing platform may then cause the project owner's client station to present a series of GUI views that may prompt the project owner to input data defining the new data object. For example, the project owner may define a form that the data object may take (e.g., document, image, etc.), as discussed above.

After receiving the information required to create the data object, the computing platform may proceed to create the data object. The computing platform may then cause the project owner's client station to display an indication that the data object has been created. In conjunction with creating the data object, or immediately succeeding creation of the data object, the computing platform may perform certain additional actions related to creation of the data object. The computing platform may establish a connection between the project owner and the data object. Furthermore, the computing platform may generate connection data associated with the connection between the project owner and the data object. Such connection data may include the project owner's default access permissions and retention settings with respect to the data object, which may be the same as the project owner's default access permissions and retention settings with respect to the project entity. Still further, to the extent that one or more collaborators have accepted begun collaboration on the project entity (e.g., accepted an invitation to collaborate) as of the time the data object is created, the computing platform may (i) establish a respective connection between the data object and each of the one or more collaborators and (ii) generate respective connection data associated with each respective connection between the data object and each of the one or more collaborators. Such connection data may include each collaborator's respective default access permissions and retention settings with respect to the data object, which may be the same as the collaborator's respective default access permissions and retention settings with respect to the project entity.

After a collaborator accepts an invitation to collaborate on a project entity (thereby accepting the collaborator's default access permissions and retention settings as configured by the owner of the project entity), the collaborator may access the project entity and perform various actions based on the collaborator's access permissions. One such action may include creating a new data object.

The process of creating a new data object as a collaborator may generally be similar to the process for creating a new data object as a project owner, with the exception of how the collaborator's access permissions and retention settings are defined for the new data object. In practice, a collaborator may In practice, to create a new data object under the project entity, a collaborator may access the construction management SaaS application via a client station that communicates with a back-end computing platform running the SaaS application. The collaborator's client station may present a GUI which the collaborator may use to navigate to a view presenting the object creation tool for creating a new data object.

After the collaborator initiates the object creation tool, the computing platform may cause the collaborator's client station to display a series of GUI views that may prompt the collaborator to input information required to create the data object.

The computing platform may cause the collaborator's client station to display an initial view prompting the collaborator to input information identifying an existing project entity under which the new data object should be created. For example, the collaborator may identify an existing project entity by selecting the existing project entity from a displayed list or by inputting information identifying the existing project entity, among other possibilities. In an instance where a new data object is related to an existing data object (e.g., the new data object is a field entity related to a given object entity), the collaborator may further identify the existing data object under which the new data object should be created. In some implementations, the collaborator may be prompted to first create the new data object and then identify one or both of an existing project entity or an existing data object with which the newly created data object is related.

After identifying an existing project entity and/or data object under which the new data object should be created, the collaborator may be prompted to confirm if it is the owner of the data object. The collaborator may input information indicating that it is the owner, transfer ownership to a different party, or designate one or more other collaborators as additional owners of the data object. In some implementations, the computing platform may forgo this step and instead automatically designate the collaborator as the owner of the new data object.

The computing platform may then cause the collaborator's client station to present a series of GUI views that may prompt the collaborator to input data defining the new data object. For example, the collaborator may define a form that the data object may take (e.g., document, image, etc.), as discussed above.

After receiving the data defining the new data object, the computing platform may cause the collaborator's client station to display a view including an option for the collaborator to configure default access permissions and retention settings, with respect to the data object, for one or more other collaborators that the collaborator will invite to collaborate on the new data object. The collaborator may then proceed to define the default access permissions and retention settings for each of the one or more other collaborators with respect to the new data object as described above with respect to a project owner defining default access permissions and retention settings for a collaborator with respect to a project entity. After completing configuration, the collaborator may then proceed to input data identifying the one or more collaborators and invite the one or more collaborators to collaborate on the new data object as described above with respect to inviting a collaborator to collaborate on a project entity. In some implementations, the computing platform may first create the new data object and then cause the collaborator's client station to display a view enabling the collaborator to define collaboration settings for one or more other collaborators with respect to the new data object.

After receiving the information required to create the data object, the computing platform may proceed to create the data object. The computing platform may then cause the collaborator's client station to display an indication that the data object has been created.

In conjunction with creating the data object, or immediately succeeding creation of the data object, the computing platform may perform certain additional actions related to creation of the data object. The computing platform may establish a connection between the collaborator and the data object. Furthermore, the computing platform may generate connection data associated with the connection between the collaborator and the data object. Such connection data may include the collaborator's defined access permissions and retention settings with respect to the data object. The collaborator's defined access permissions and retention settings with respect to the data object may or may not be the same as the collaborator's default access permissions and retention settings with respect to the project entity.

In some instances, it may be desirable to define for a collaborator, with respect to a given data object created by the collaborator, a set of access permissions and retention settings that is different from the collaborator's default access permissions and retention settings.

As one example, it may generally be desirable for a collaborator to have a broad scope of access permissions and retention settings for data objects created by the collaborator. For example, it may be desirable for a collaborator to have full access permissions and full retention rights with respect to data objects created by the collaborator. Therefore, a collaborator's defined access permissions and retention settings for data objects created by the collaborator may be, instead of the default access and retention settings, a set of "creator" access permissions and retention settings.

Such "creator" access permissions and retention settings may further depend on whether or not the data object is private or shared. For instance, each party connected to a project entity may have a private workspace that may be used to create private data objects that the party does not wish to share with another party. In such instances, it may be desirable for the collaborator to have full access permissions and full retention rights with respect to the private data object. Therefore, where a given data object is created by a collaborator within the collaborator's private workspace, the collaborator's defined access permissions and retention settings for the given data object may be a set of "private-creator" access permission and retention settings.

However, if a collaborator shares the given data object with one or more other parties (either at the time of creating the data object or at a subsequent time), it may be desirable for the collaborator to have limited retention rights rather than full retention rights with respect to the given data object. Therefore, where a given data object is created by a collaborator within the collaborator's private workspace but shared with one or more other collaborators, the collaborator's defined access permissions and retention settings for the given data object may be a set of "shared-creator" access permission and retention settings.

In some instances, a collaborator's access permissions and retention settings for a given data object may be automatically reconfigured at a time after the given data object is created. For example, the collaborator may have initially created the given data object in its private workspace, thereby causing the computing platform to define, as the collaborator's access permissions and retention settings for the given data object, the "private-creator" access permissions and retention settings. However, the collaborator may later share the given data object with the project owner in order to collaborate on the given data object. In such an instance, the computing platform may automatically reconfigure the collaborator's settings for the given data object, thereby defining, as the collaborator's access permissions and retention settings for the given data object, the "shared-creator" access permissions and retention settings.

As another example, it may generally be desirable to limit retention of confidential information. For instance, a given data object may contain confidential information such as Personally Identifiable Information (PII), Personal Health Information (PHI), or Social Security Information, among other possibilities. Such confidential information may be identified during the process of creating the given data object. For example, a construction professional conducting a quality assurance inspection at a construction site may have experienced an injury and submitted a claim via the construction management software application. The claim may have included various PII and/or PHI, such as the construction professional's name, birthdate, and healthcare information, as well as images of the injury. The construction professional may have tagged the claim as including PII/PHI during submission. Subsequently, if the construction professional wishes to delete one or more images, or withdraw the claim entirely, it may be generally desirable to prevent retention of such information, even by the construction professional himself. Therefore, where a given data object contains sensitive data, the collaborator's defined access permissions and retention settings for the given data object may be a set of "confidential" access permission and retention settings. Based on implementing the various analyses described above, the computing platform may define an appropriate set of access permissions and retention settings for the collaborator with respect to the new data object.

Still further, to the extent that the data object is shared with one or more other collaborators, the computing platform may (i) establish a respective connection between the data object and each of the one or more other collaborators and (ii) generate respective connection data associated with each respective connection between the data object and each of the one or more other collaborators. Such connection data may include each other collaborator's respective default access permissions and retention settings with respect to the data object as configured by the collaborator.

Figure 6:
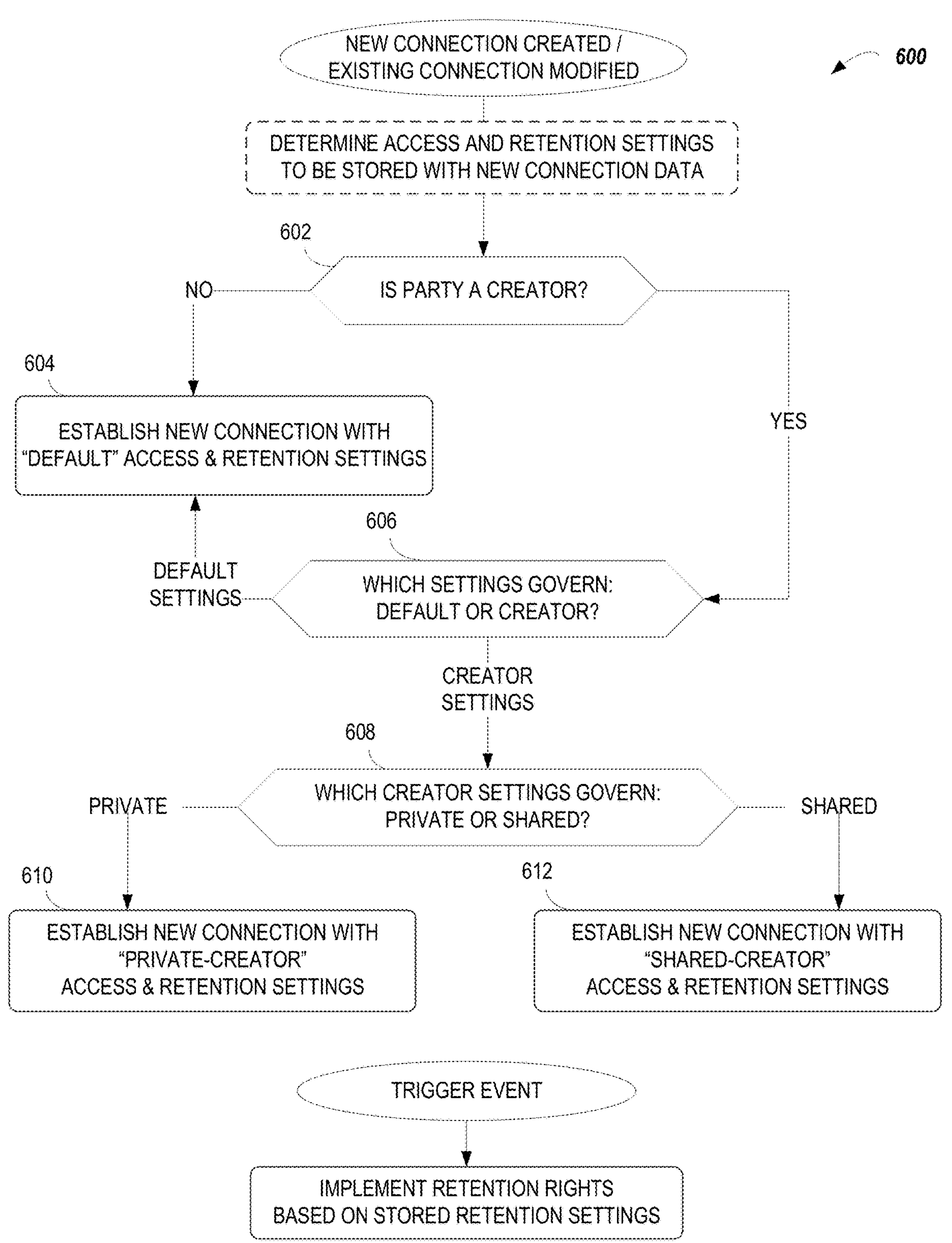
FIG. 6 depicts an example workflow that may be implemented by a computing platform to configure access permissions and retention settings for a given party.

FIG. 6 depicts an example process 600 that may be carried out by a computing platform in order to define a collaborator's access permissions and retention settings for a data object. It should be understood that each block in flow diagram 600 may represent a module or portion of program code that includes instructions that are executable by a processor to implement specific logical functions or steps in a process. The program code may be stored on any type of computer-readable medium, such as non-transitory computer readable media (e.g., data storage 204 shown in FIG. 2). In other cases, a block in a flow diagram may represent circuitry that is wired to perform specific logical functions or steps in a process. Moreover, the blocks shown in the flow diagrams may be rearranged into different orders, combined into fewer blocks, separated into additional blocks, and/or removed, based upon the particular embodiment. The flow diagram 600 may also be modified to include additional blocks that represent other functionality that is described expressly or implicitly elsewhere herein.

Further, as a general matter, when reference is made herein to a "computing platform" engaging in one or more operations, it should be understood that such operations may, in practice, be carried out by one or more computing devices executing one or more instances of the disclosed software tool(s). In particular, it should be understood that such example operations may be carried out by a computing device, such as computing device 200 (FIG. 2), which as described above, may serve as one or more of client stations 112 (FIG. 1) and/or back-end computing platform 102 (FIG. 1). In this respect, it should be further understood that, depending on the implementation, the operations discussed herein below may be carried out entirely by a single computing device, such as one or more of client stations 112 or by back-end computing platform 102, or may be carried out by a combination of computing devices, with some operations being carried out by back-end computing platform 102 (such as computational processes and data-access operations) and other operations being carried out by one or more of client stations 112 (such as display operations and operations that receive user inputs). However, other arrangements are possible as well.

In general, the example process 600 may be initiated when (i) a new connection between a data object and a collaborator is established or (ii) an existing connection between a data object and a collaborator is modified.

The example process may begin at step 602, where the computing platform may determine whether the collaborator is a creator of the data object. Information regarding a given collaborator's relationship to a given data object may be stored with the data entity of the given collaborator, the data entity of the given data object, or both.

If the computing platform determines that the collaborator is not a creator of the data object, it may proceed to block 604. At block 604, the computing platform may establish a connection between the collaborator and the data object and generate associated connection data that defines, as the collaborator's access permissions and retention settings for the data object, the collaborator's default access permissions and retention settings for the project entity.

If the computing platform determines that the collaborator is a creator of the data object, it may proceed to block 606. At block 606, the computing platform may determine which set of access and retention settings should govern: default settings or creator settings. If the computing platform determines that the default settings should govern, it may proceed to establish a connection between the collaborator and the data object and generate associated connection data that defines, as the collaborator's access permissions and retention settings for the data object, the collaborator's default access permissions and retention settings for the project entity. However, if the computing platform determines that the creator settings should govern, it may proceed to block 608.

At block 608, the computing platform may determine which creator settings should govern: private-creator settings or shared-creator settings. If the data object created by the collaborator is private and was not shared, the computing platform may proceed to block 610. At block 610, the computing platform may establish a connection between the collaborator and the data object and generate associated connection data that defines, as the collaborator's access permissions and retention settings for the data object, private-creator access permission and retention settings. If the data object created by the collaborator was shared with one or more other collaborators, the computing platform may proceed to block 612. At block 612, the computing platform may establish a connection between the collaborator and the data object and generate associated connection data that defines, as the collaborator's access permissions and retention settings for the data object, shared-creator access permissions and retention settings.

The computing platform may implement the example process 600 when defining the access permissions and retention settings for a collaborator with respect to every new data object that is created under a project entity. After (i) a connection between a given collaborator and a given data object is established and (ii) associated connection data defining the given collaborator's access permissions and retention settings for the given data object is generated, the collaborator's defined retention settings may be used to implement a collaborator's retention rights for the given data object in the event that the given collaborator's access permissions with respect to the given data object are revoked.

In general, a given collaborator's data retention rights may be invoked by the onset of one or more trigger events. Trigger events may generally be events that reduce or revoke the given collaborator's access permissions with respect to one or more data objects. Trigger events may take various forms.

As one possibility, a trigger event may be a deletion of data—that is, when one or more data objects previously accessible to the given collaborator are deleted. For example, a project owner may have created a communication thread (e.g., a chat) to communicate with a collaborator. Subsequently, the project owner may delete the communication thread, thereby revoking the collaborator's access to the communication thread. Deletion of the communication thread may thus act as a trigger event for the collaborator, thereby causing the computing platform to determine, based on the collaborator's defined retention settings stored in the connection data associated with the collaborator's connection to the communication thread, an extent to which the collaborator may retain access to the communication thread.

As another possibility, a trigger event may be a direct revocation of access—that is, when a given collaborator's access to one or more given data objects is specifically revoked. For example, a project owner may have shared access with a collaborator to data objects A, B, and C, corresponding with a given project task assigned to the collaborator. The project owner may have been displeased with the collaborator's work. Upon deciding to terminate the collaborator, the project owner may have manually reconfigured the collaborator's access permissions to revoke access to all of data objects A, B, and C. Revocation of the collaborator's access to data objects A, B, and C may thus act as a trigger event for the collaborator, thereby causing the computing platform to determine, based on the collaborator's defined retention settings stored in the respective connection data associated with the collaborator's respective connections to data objects A, B, and C, an extent to which the collaborator may retain a copy of each of data objects A, B, and C.

As yet another possibility, a trigger event may be a time-based event. A time-based event may take various forms. As one example, a time-based event may comprise an expiration of a specified period of time. For example, a collaborator's access permissions settings may dictate that the collaborator's access to a given data object is valid for a specified, finite period of time (e.g., 4 weeks). Upon the expiration of the specified period of time, the collaborator's access to the given data object may be automatically revoked, thereby causing the computing platform to determine, based on the collaborator's defined retention settings stored in the connection data associated with the collaborator's connection to the given data object, an extent to which the collaborator may retain a copy of the given data object. As another example, a time-based event may comprise an onset of a specified date and/or time. As yet another example, a time-based event may comprise a duration corresponding with a given construction phase of the construction project. Other examples are also possible.

As yet a further possibility, a trigger event may be completion or cessation of a given project, thereby causing the computing platform to determine, based on the defined retention settings for each collaborator with respect to each data object related to the given project, an extent to which the collaborator may retain a copy of each data object. Other examples of trigger events are also possible.

In response to a trigger event involving a given collaborator and a given data object, the computing platform may determine, based on the defined access permissions and retention settings stored in the connection data associated with the connection between the given collaborator and the given data object, a retention level for the given collaborator's retention of the given data object. As mentioned before, retention rights may generally fall under three categories: full retention, partial retention, and no retention.

The computing platform may then proceed to implement the given collaborator's retention rights based on the determined retention level. Implementing full retention rights may comprise (i) determining a date and a time corresponding to the trigger event that caused a given party's access to a given data object to be revoked, (ii) identifying a version of the given data object as of the determined date and time, and (iii) causing an editable copy of the identified version of the given data object to be stored in a location accessible by the given party. For example, the computing platform may store the editable copy (e.g., a .DOCX version) in the given party's SaaS account.

Implementing partial retention rights may comprise (i) determining a date and a time corresponding to the trigger event that caused a given party's access to a given data object to be revoked, (ii) identifying a version of the given data object as of the determined date and time, and (iii) causing a read-only copy of the identified version to be stored in a location accessible by the given party. For example, the computing platform may store the read-only copy (e.g., a .PDF version) in the given party's SaaS account.

Implementing no retention rights may comprise eliminating a given party's connection to a given data object. In some instances, the given party may object to its inability to retain access to given project data and may request to retain access, which may require the given party to provide a valid reason for retaining access and approval by the project owner for the given party to retain access.

e. Example Data Structure

Figure 7A:
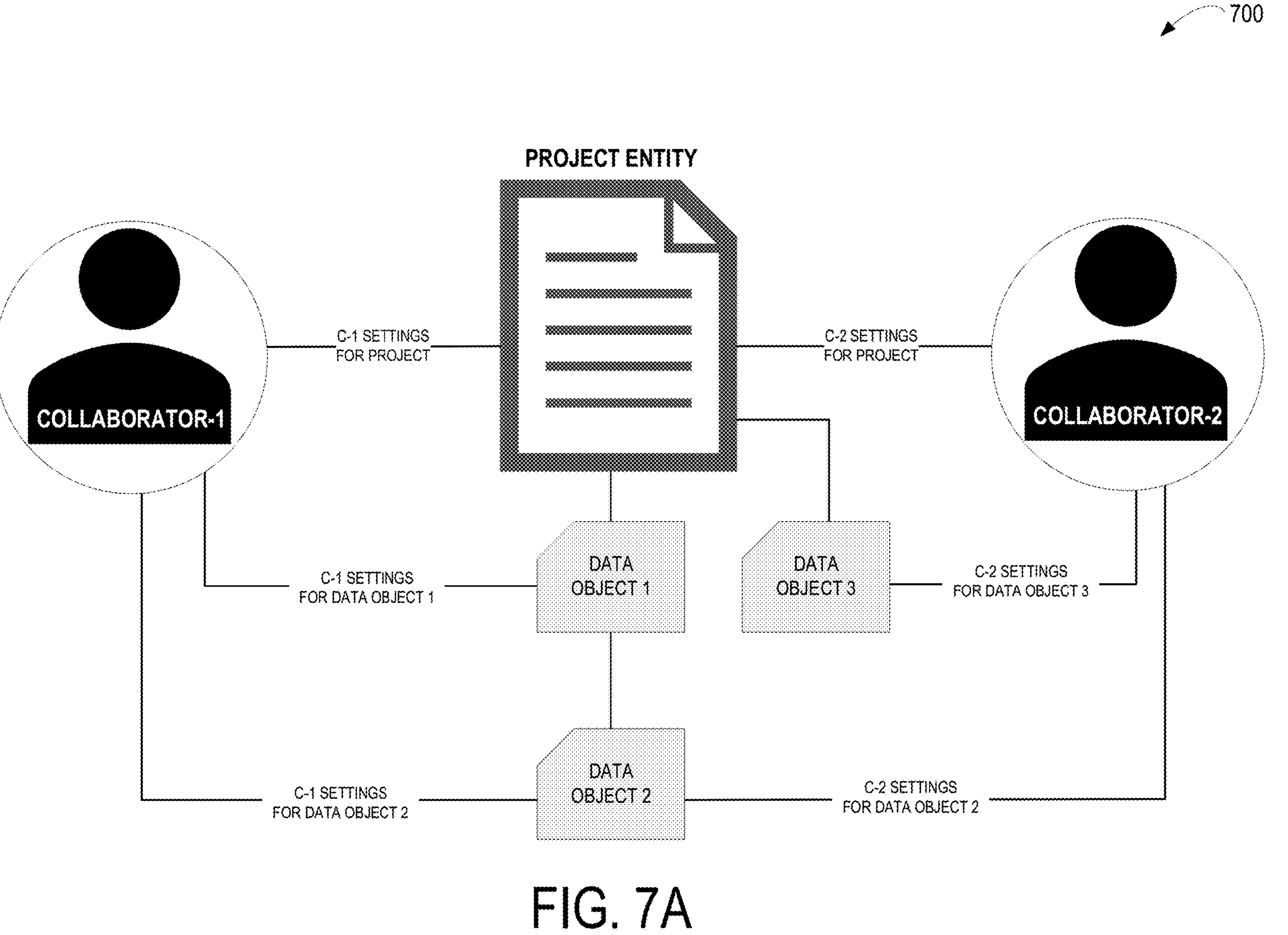
FIG. 7A depicts a second example diagram of a relationship structure according to the disclosed model for managing data for and enabling collaboration of parties related to a construction project.
Figure 7B:
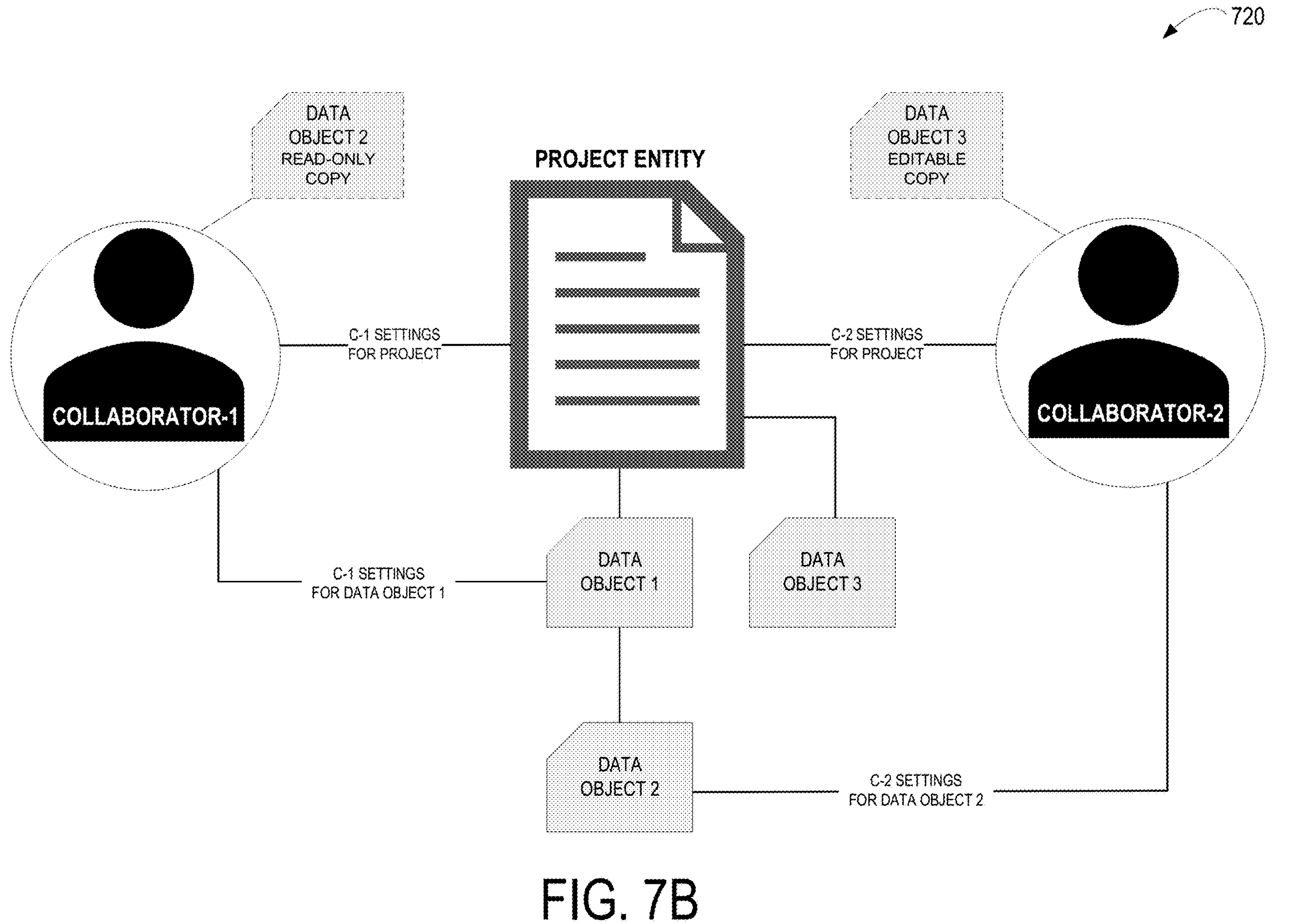
FIG. 7B depicts a third example diagram of a relationship structure according to the disclosed model for managing data for and enabling collaboration of parties related to a construction project.

FIGS. 7A-7B depict example data structures 700 and 720, respectively, related to a given project entity, which may have been created using a project creation tool of a construction management SaaS application as discussed above. The given project entity may have established respective connections with multiple collaborators and multiple data objects, including collaborators and data objects not shown in FIG. 7A or 7B.

As shown in FIG. 7A, a first collaborator "Collaborator-1" and a second collaborator "Collaborator-2" may have respective established connections with the given project entity. The connection between Collaborator-1 and the project entity may be associated with connection data including Collaborator-1's default access permissions and retention settings as configured by a project owner of the given project entity. Similarly, the connection between Collaborator-2 and the project entity may be associated with connection data including Collaborator-2's default access permissions and retention settings as configured by the project owner of the given project.

Furthermore, a first data object "Data Object 1" created under the project entity may have a first connection with the project entity and a second connection with Collaborator-1. The connection between Collaborator-1 and Data Object 1 may be associated with connection data that includes Collaborator-1's defined access permissions and retention settings with respect to Data Object 1. These defined "C-1 Settings for Data Object 1" may have been configured as discussed above with respect to FIG. 6 and may or may not be the same as the default "C-1 Settings for Project."

A second data object "Data Object 2" created under Data Object 1 may have a first connection with Data Object 1, a second connection with Collaborator-1, and a third connection with Collaborator-2. The connection between Collaborator-1 and Data Object 2 may be associated with connection data that includes Collaborator-1's defined access permissions and retention settings with respect to Data Object 2. These defined "C-1 Settings for Data Object 2" may have been configured as discussed above with respect to FIG. 6 and may or may not be the same as the default "C-1 Settings for Project." The connection between Collaborator-2 and Data Object 2 may similarly be associated with connection data that includes Collaborator-2's defined access permissions and retention settings with respect to Data Object 2. These defined "C-2 Settings for Data Object 1" may have been configured as discussed above with respect to FIG. 6 and may or may not be the same as the default "C-2 Settings for Project."

A third data object "Data Object 3" created under the project entity may have a first connection with the project entity and a second connection with Collaborator-2. The connection between Collaborator-2 and Data Object 3 may be associated with connection data that includes Collaborator-2's defined access permissions and retention settings with respect to Data Object 3. These defined "C-2 Settings for Data Object 3" may have been configured as discussed above with respect to FIG. 6 and may or may not be the same as the default "C-2 Settings for Project."

When a trigger event occurs, as described above, for any one of Collaborator-1 or Collaborator-2 with respect to a given data object, the computing platform may refer to Collaborator-1 or Collaborator-2's respective defined data retention settings for the given data object to determine to what extent Collaborator-1 or Collaborator-2 may retain a copy of the given data object.

For example, FIG. 7B illustrates an example data structure 720, which depicts a modified version of the example data structure 700 after Collaborator-1's access to Data Object 2 was revoked and Collaborator-2's access to Data Object 3 was revoked. When Collaborator-1's access to Data Object 2 was revoked, the computing platform may have determined, based on the defined "C-1 Settings for Data Object 2," that Collaborator-1's defined retention settings dictated partial retention such that Collaborator-1 had the right to retain a read-only copy of Data Object 2. Therefore, the computing platform may have implemented the defined "C-1 Settings for Data Object 2" settings by eliminating Collaborator-1's connection with Data Object 2 and causing a read-only copy of Data Object 2 to be stored in Collaborator-1's SaaS application account.

Additionally, when Collaborator-2's access to Data Object 3 was revoked, the computing platform may have determined, based on the defined "C-2 Settings for Data Object 3," that Collaborator-2's retention settings dictated full retention such that Collaborator-2 had the right to retain an editable copy of Data Object 3. Therefore, the computing platform may have implemented the defined "C-2 Settings for Data Object 3" settings by eliminating Collaborator-2's connection with Data Object 3 and causing an editable copy of Data Object 3 to be stored in Collaborator-2's SaaS application account.

As shown in FIG. 7B, because each respective connection between each collaborator and each data object and each connection's respective connection data is stored independently of the data entity of any given party or data object, eliminating the connections between Collaborator-1 and Data Object 2 and Collaborator-2 and Data Object 3 does not impact the data structures of Data Objects 2 and 3.

In the ways discussed above, employing the disclosed data management and collaborative model may enable a construction management software application to more efficiently facilitate data management and collaboration for a construction project.

V. CONCLUSION

Example embodiments of the disclosed innovations have been described above. Those skilled in the art will understand, however, that changes and modifications may be made to the embodiments described without departing from the true scope and spirit of the present invention, which will be defined by the claims.

For instance, those in the art will understand that the disclosed data management and collaborative model may be implemented in areas other than construction and construction-related projects. The disclosed software technology for managing data, data access, and data retention may be used in other ways as well.

Further, to the extent that examples described herein involve operations performed or initiated by actors, such as "humans," "operators," "users" or other entities, this is for purposes of example and explanation only. The claims should not be construed as requiring action by such actors unless explicitly recited in the claim language.

The invention claimed is:

1. A computing system comprising:

a network interface;

at least one processor;

at least one non-transitory computer-readable medium; and program instructions stored on the at least one non-transitory computer-readable medium that are executable by the at least one processor such that the computing system is configured to:

receive, via the network interface, from a first client station associated with a first party, a first request to create a project-entity data record representing a given construction project;

after receiving the first request to create a project-entity data record representing the given construction project:

create the project-entity data record representing the given construction project;

establish a first connection between a first party-entity data record representing the first party and the project-entity data record representing the given construction project, wherein establishing the first connection comprises generating first connection data that encodes data retention permissions for the first party with respect to the project-entity data record representing the given construction project; and cause the first connection data to be stored separately from the project-entity data record;

receive, via the network interface, from the first client station associated with the first party, a second request to issue an invitation for a second party to electronically collaborate on the given construction project, wherein the second request indicates data retention permissions for the second party with respect to the project-entity data record representing the given construction project; and based on a determination that the second party has accepted the invitation to collaborate on the given construction project:

establish a second connection between a second party-entity data record representing the second party and the project-entity data record representing the given construction project, wherein establishing the second connection comprises generating second connection data that encodes the data retention permissions for the second party with respect to the project-entity data record representing the given construction project; and cause the second connection data to be stored separately from the project-entity data record;

detect a trigger event for determining an extent to which the second party is authorized to retain a copy of the project-entity data record; and in response to detecting the trigger event:

access the second connection data that is stored separately from the project-entity data record;

determine a retention level of the second party with respect to the project-entity data record representing the given construction project based on the data retention permissions encoded in the second connection data;

based on the retention level, determine whether the second party has rights to retain a copy of the project-entity data record;

based on determining that the second party has rights to retain a copy of the project-entity data record, cause a copy of the project-entity data record to be stored in a data repository accessible to the second party; and delete the second connection between the second party-entity data record representing the second party and the project-entity data record.

2. The computing system of claim 1, further comprising program instructions stored on the at least one non-transitory computer-readable medium that are executable by the at least one processor such that the computing system is configured to:

establish a respective connection between the second party-entity data record and each respective object-entity data record representing a respective data object in a first set of data objects associated with the given construction project, wherein establishing each respective connection comprises generating respective connection data that encodes respective data retention permissions for the second party with respect to the respective data object.

3. The computing system of claim 2, wherein, for each respective data object in the first set of data objects, the respective data retention permissions for the second party with respect to the respective data object are defined based on the data retention permissions for the second party with respect to the project-entity data record representing the given construction project.

4. The computing system of claim 2, wherein the trigger event is a first trigger event, and wherein the computing system further comprises program instructions stored on the at least one non-transitory computer-readable medium that are executable by the at least one processor such that the computing system is configured to:

detect a second trigger event for determining an extent to which the second party is authorized to retain a copy of a given data object in the first set of data objects; and in response to detecting the second trigger event, determine a retention level of the second party with respect to the given data object based on the respective connection data that encodes the respective data retention permissions for the second party with respect to the given data object.

5. The computing system of claim 4, wherein the retention level of the second party with respect to the given data object comprises one of: read/write retention, read-only retention, or no retention.

6. The computing system of claim 4, wherein the second trigger event comprises either a request to delete the given data object or an indication that the second party no longer has access to the given construction project.

7. The computing system of claim 4, further comprising program instructions stored on the at least one non-transitory computer-readable medium that are executable by the at least one processor such that the computing system is configured to:

in response to detecting the second trigger event, delete the respective connection between the second party-entity data record and the respective object-entity data record representing the given data object.

8. The computing system of claim 2, further comprising program instructions stored on the at least one non-transitory computer-readable medium that are executable by the at least one processor such that the computing system is configured to:

receive, from a second client station associated with the second party, a request to create a new data object associated with the given construction project; and establish a new connection between the second party-entity data record and a new object-entity data record representing the new data object in a second set of data objects, wherein establishing the new connection comprises generating new connection data that encodes data retention permissions for the second party with respect to the new data object that differ from the respective data retention permissions for the second party with respect to the respective data objects in the first set of data objects.

9. The computing system of claim 8, wherein:

the respective data retention permissions for the second party with respect to the respective data objects in the first set of data objects comprise either read-only retention or no retention; and the data retention permissions for the second party with respect to the new data object comprise read/write retention.

10. The computing system of claim 1, wherein the trigger event comprises either a request to delete the project-entity data record representing the given construction project or an indication that the second party no longer has access to the given construction project.

11. The computing system of claim 1, wherein the retention level of the second party with respect to the project-entity data record representing the given construction project comprises one of: read/write retention, read-only retention, or no retention.

12. The computing system of claim 1, wherein:

the first connection data further encodes information about a given role of the first party with respect to the project-entity data record; and the second connection data further encodes information about a given role of the second party with respect to the project-entity data record.

13. A non-transitory computer-readable medium, wherein the non-transitory computer-readable medium is provisioned with program instructions that, when executed by at least one processor, cause a computing system to:

receive, via a network interface, from a first client station associated with a first party, a first request to create a project-entity data record representing a given construction project;

after receiving the first request to create a project-entity data record representing the given construction project:

create the project-entity data record representing the given construction project;

establish a first connection between a first party-entity data record representing the first party and the project-entity data record representing the given construction project, wherein establishing the first connection comprises generating first connection data that encodes data retention permissions for the first party with respect to the project-entity data record representing the given construction project; and cause the first connection data to be stored separately from the project-entity data record;

receive, via the network interface, from the first client station associated with the first party, a second request to issue an invitation for a second party to electronically collaborate on the given construction project, wherein the second request indicates data retention permissions for the second party with respect to the project-entity data record representing the given construction project; and based on a determination that the second party has accepted the invitation to collaborate on the given construction project:

establish a second connection between a second party-entity data record representing the second party and the project-entity data record representing the given construction project, wherein establishing the second connection comprises generating second connection data that encodes the data retention permissions for the second party with respect to the project-entity data record representing the given construction project; and cause the second connection data to be stored separately from the project-entity data record;

detect a trigger event for determining an extent to which the second party is authorized to retain a copy of the project-entity data record; and in response to detecting the trigger event:

access the second connection data that is stored separately from the project-entity data record;

determine a retention level of the second party with respect to the project-entity data record representing the given construction project based on the data retention permissions encoded in the second connection data;

based on the retention level, determine whether the second party has rights to retain a copy of the project-entity data record;

based on determining that the second party has rights to retain a copy of the project-entity data record, cause a copy of the project-entity data record to be stored in a data repository accessible to the second party; and delete the second connection between the second party-entity data record representing the second party and the project-entity data record.

14. The non-transitory computer-readable medium of claim 13, wherein the non-transitory computer-readable medium is also provisioned with program instructions that, when executed by the at least one processor, cause the computing system to:

establish a respective connection between the second party-entity data record and each respective object-entity data record representing a respective data object in a first set of data objects associated with the given construction project, wherein establishing each respective connection comprises generating respective connection data that encodes respective data retention permissions for the second party with respect to the respective data object.

15. The non-transitory computer-readable medium of claim 14, wherein, for each respective data object in the first set of data objects, the respective data retention permissions for the second party with respect to the respective data object are defined based on the data retention permissions for the second party with respect to the project-entity data record representing the given construction project.

16. The non-transitory computer-readable medium of claim 14, wherein the trigger event is a first trigger event, and wherein the non-transitory computer-readable medium is also provisioned with program instructions that, when executed by the at least one processor, cause the computing system to:

detect a second trigger event for determining an extent to which the second party is authorized to retain a copy of a given data object in the first set of data objects; and in response to detecting the second trigger event, determine a retention level of the second party with respect to the given data object based on the respective connection data that encodes the respective data retention permissions for the second party with respect to the given data object.

17. The non-transitory computer-readable medium of claim 14, wherein the non-transitory computer-readable medium is also provisioned with program instructions that, when executed by the at least one processor, cause the computing system to:

receive, from a second client station associated with the second party, a request to create a new data object associated with the given construction project; and establish a new connection between the second party-entity data record and a new object-entity data record representing the new data object in a second set of data objects, wherein establishing the new connection comprises generating new connection data that encodes data retention permissions for the second party with respect to the new data object that differ from the respective data retention permissions for the second party with respect to the respective data objects in the first set of data objects.

18. The non-transitory computer-readable medium of claim 17, wherein:

the respective data retention permissions for the second party with respect to the respective data objects in the first set of data objects comprise either read-only retention or no retention; and the data retention permissions for the second party with respect to the new data object comprise read/write retention.

19. A method carried out by a computing system, the method comprising:

receiving, via a network interface, from a first client station associated with a first party, a first request to create a project-entity data record representing a given construction project;

after receiving the first request to create a project-entity data record representing the given construction project:

creating the project-entity data record representing the given construction project;

establishing a first connection between a first party-entity data record representing the first party and the project-entity data record representing the given construction project, wherein establishing the first connection comprises generating first connection data that encodes data retention permissions for the first party with respect to the project-entity data record representing the given construction project; and causing the first connection data to be stored separately from the project-entity data record;

receiving, via the network interface, from the first client station associated with the first party, a second request to issue an invitation for a second party to electronically collaborate on the given construction project, wherein the second request indicates data retention permissions for the second party with respect to the project-entity data record representing the given construction project; and based on a determination that the second party has accepted the invitation to collaborate on the given construction project:

establishing a second connection between a second party-entity data record representing the second party and the project-entity data record representing the given construction project, wherein establishing the second connection comprises generating second connection data that encodes the data retention permissions for the second party with respect to the project-entity data record representing the given construction project; and causing the second connection data to be stored separately from the project-entity data record;

detecting a trigger event for determining an extent to which the second party is authorized to retain a copy of the project-entity data record; and in response to detecting the trigger event:

accessing the second connection data that is stored separately from the project-entity data record;

determining a retention level of the second party with respect to the project-entity data record representing the given construction project based on the data retention permissions encoded in the second connection data;

based on the retention level, determining whether the second party has rights to retain a copy of the project-entity data record;

based on determining that the second party has rights to retain a copy of the project-entity data record, causing a copy of the project-entity data record to be stored in a data repository accessible to the second party; and deleting the second connection between the second party-entity data record representing the second party and the project-entity data record.

20. The method of claim 19, further comprising:

establishing a respective connection between the second party-entity data record and each respective object-entity data record representing a respective data object in a first set of data objects associated with the given construction project, wherein establishing each respective connection comprises generating respective connection data that encodes respective data retention permissions for the second party with respect to the respective data object.

* * * * *